(12) United States Patent
Liu et al.

(10) Patent No.: US 11,810,454 B2
(45) Date of Patent: Nov. 7, 2023

(54) MAP DATA CONSTRUCTION METHOD VEHICLE TERMINAL, AND SERVER

(71) Applicant: Huawei Technologies Co., Ltd., Shenzhen (CN)

(72) Inventors: Zhenchun Liu, Shenzhen (CN); Jingwei Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 300 days.

(21) Appl. No.: 16/818,662

(22) Filed: Mar. 13, 2020

(65) Prior Publication Data
US 2020/0219388 A1    Jul. 9, 2020

Related U.S. Application Data

(63) Continuation of application No. PCT/CN2018/105680, filed on Sep. 14, 2018.

(30) Foreign Application Priority Data

Sep. 15, 2017   (CN) .......................... 201710831221.7

(51) Int. Cl.
*G08G 1/01*   (2006.01)
*H04W 4/44*   (2018.01)

(52) U.S. Cl.
CPC ......... *G08G 1/0141* (2013.01); *G08G 1/0112* (2013.01); *H04W 4/44* (2018.02)

(58) Field of Classification Search
CPC ...... G08G 1/0141; G08G 1/0112; G08G 1/01; H04W 4/44; G06F 16/29; H04L 67/12; H04L 29/06; H04L 29/08; H04L 67/10; H04L 69/22; G07C 5/0808; G07C 5/008
See application file for complete search history.

(56) References Cited

U.S. PATENT DOCUMENTS 9,435,654 B2    9/2016  Ibrahim et al.
11,060,882 B2 *  7/2021  Di Pietro ........... G01C 21/3679
11,188,575 B2 * 11/2021  Giurgiu ................ G01C 21/32
(Continued)

FOREIGN PATENT DOCUMENTS

CN         1658190 A      8/2005
CN       103531024 A      1/2014
(Continued)

*Primary Examiner* — Aniss Chad
*Assistant Examiner* — Christopher George Fees
(74) *Attorney, Agent, or Firm* — Conley Rose, P.C.

(57) ABSTRACT

A map data construction method and device, where the method includes obtaining first basic safety information packets of a vehicle, where the first basic safety information packets include an information packet of the vehicle that is collected when a safety event occurs, obtaining first basic safety information data from the first basic safety information packets, where the first basic safety information data includes parameter information of the vehicle and extended safety information, the parameter information of the vehicle indicates a driving state and an appearance information of the vehicle, and the extended safety information is used to indicate a safety state of the vehicle and a safety state of a road, and performing model processing based on the first basic safety information data to generate the map data.

20 Claims, 11 Drawing Sheets

Obtain first basic safety information packets of a vehicle, where the first basic safety information packets include an information packet of the vehicle that is collected when a safety event occurs — 101

Obtain first basic safety information data from the first basic safety information packets, where the first basic safety information data includes parameter information of the vehicle and extended safety information, the parameter information of the vehicle is used to indicate a driving state and an appearance form of the vehicle, and the extended safety information is used to indicate a safety state of the vehicle and a safety state of a road — 102

Perform model processing based on the first basic safety information data to generate map data — 103

(56) References Cited

U.S. PATENT DOCUMENTS

| | | | |
|---|---|---|---|
| 2005/0198299 A1* | 9/2005 | Beck | G06Q 10/107 709/225 |
| 2009/0037087 A1 | 2/2009 | Qi et al. | |
| 2010/0217455 A1* | 8/2010 | Stahlin | G01C 21/32 701/1 |
| 2013/0151088 A1* | 6/2013 | Ricci | G08G 1/0133 701/1 |
| 2014/0358414 A1* | 12/2014 | Ibrahim | G08G 1/0141 701/119 |
| 2017/0025015 A1* | 1/2017 | Thompson | G08G 1/166 |
| 2018/0113880 A1* | 4/2018 | Metcalf-Putnam | G06F 16/24532 |
| 2018/0188045 A1* | 7/2018 | Wheeler | G06F 18/22 |
| 2020/0245109 A1* | 7/2020 | Yang | H04W 4/12 |

FOREIGN PATENT DOCUMENTS

| | | |
|---|---|---|
| CN | 104933856 A | 9/2015 |
| CN | 105644567 A | 6/2016 |
| CN | 105929815 A | 9/2016 |
| CN | 105976606 A | 9/2016 |
| CN | 106846863 A | 6/2017 |
| CN | 107031600 A | 8/2017 |
| JP | 2009026307 A | 2/2009 |
| JP | 2009277059 | 11/2009 |
| JP | 2010504560 | 2/2010 |

\* cited by examiner

MAP DATA CONSTRUCTION METHOD VEHICLE TERMINAL, AND SERVER

CROSS-REFERENCE TO RELATED APPLICATION

This application is a continuation of International Patent Application No. PCT/CN2018/105680 filed on Sep. 14, 2018, which claims priority to Chinese Patent Application No. 201710831221.7 filed on Sep. 15, 2017. The disclosures of the aforementioned applications are hereby incorporated by reference in their entireties.

TECHNICAL FIELD

This application relates to internet of vehicles technologies, and in particular, to a map data construction method and device.

BACKGROUND

In recent years, an internet of vehicles technology based on vehicle-to-everything (V2X) is increasingly mature, and basic vehicle information may provide important decision support for behavior planning and control of a driving vehicle based on road traffic information.

The basic vehicle information includes information such as a timestamp, and a position, a speed, an acceleration, a posture, and dimensions of a vehicle. The basic vehicle information may be broadcast by a network facility to a surrounding vehicle, and the vehicle may obtain map data based on the basic information to construct a map. The map data may include data such as lane speed limit information, a geometric lane line figure, a lane line width, and a lane topology relationship. For example, the lane speed limit information is analyzed and output based on the speed information in the basic vehicle information, a historical track in the basic vehicle information is used to fit the geometric lane line figure, analyze an attribute such as the lane line width, and construct the lane topology relationship, the map is constructed based on the map data such as the lane speed limit information, the geometric lane line figure, the lane line width, and the lane topology relationship, and the map data may be further optimized using information such as traffic control.

The map constructed using the foregoing method is a real-time static map that mainly includes lane line information. Consequently, road traffic safety and stability are relatively low when vehicle behavior is planned and controlled using the map.

SUMMARY

This application provides a map data construction method and device, to reduce some traffic accidents, thereby improving road traffic safety and stability.

A first aspect of this application provides a map data construction method. The method is applied to a vehicle, and includes obtaining first basic safety information packets of the vehicle, where the first basic safety information packets include an information packet of the vehicle that is collected when a safety event occurs, obtaining first basic safety information data from the first basic safety information packets, where the first basic safety information data includes parameter information of the vehicle and extended safety information, the parameter information of the vehicle is used to indicate a driving state and an appearance information of the vehicle, and the extended safety information is used to indicate a safety state of the vehicle and a safety state of a road, and performing model processing based on the first basic safety information data to generate the map data.

In the foregoing solution, when the safety event occurs, the first basic safety information packets of the vehicle are obtained. The first basic safety information data is obtained from the first basic safety information packets, and model processing is performed based on the first basic safety information data to generate the map data. The first basic safety information data includes the parameter information of the vehicle and the extended safety information such that the constructed map data not only includes the parameter information of the vehicle, but also includes the extended safety information. A self-driving vehicle may obtain some unsafe factors of the vehicle and the road based on the extended safety information, and plan and control vehicle behavior. This reduces some traffic accidents, and improves road traffic safety and stability.

In a possible implementation, obtaining first basic safety information data from the first basic safety information packets includes screening the first basic safety information packets in time domain and space domain to obtain second basic safety information packets, checking data quality of the second basic safety information packets to obtain third basic safety information packets, and performing sorting and queue management on the third basic safety information packets to obtain the first basic safety information data.

In the foregoing solution, the first basic safety information packets are screened in the time domain and the space domain to obtain the second basic safety information packets, the data quality of the second basic safety information packets is checked to obtain the third basic safety information packets, and sorting and queue management is performed on the third basic safety information packets to obtain the first basic safety information data. Therefore, data quality and reliability of the first basic safety information data are improved, and the first basic safety information data is sequentially managed.

In a possible implementation, screening the first basic safety information packets in time domain and space domain to obtain second basic safety information packets includes obtaining position information of the vehicle and a current timestamp, and performing data filtering on the first basic safety information packets based on the position information of the vehicle, the current timestamp, a preset time range, and a preset space range, to obtain the second basic safety information packets.

In the foregoing solution, the preset time range and the preset space range constitute a buffer area, a first basic safety information packet in the buffer area is reserved, and a first basic safety information packet falling beyond the buffer area is discarded such that data validity can be ensured, and memory saving is implemented.

In a possible implementation, the checking data quality of the second basic safety information packets to obtain third basic safety information packets includes checking whether the second basic safety information packets conform to a data quality criterion, where the data quality criterion includes data integrity and data accuracy, and if the second basic safety information packets conform to the data quality criterion, outputting the third basic safety information packets based on a preset confidence value, or if the second basic safety information packets do not conform to the data quality criterion, discarding the second basic safety information packets.

In a possible implementation, outputting the third basic safety information packets based on a preset confidence value includes calculating confidence values of the second basic safety information packets, and if the confidence values of the second basic safety information packets each are greater than or equal to the preset confidence threshold, using the second basic safety information packets as the third basic safety information packets, or if the confidence values of the second basic safety information packets each are less than the preset confidence threshold, discarding the second basic safety information packets.

In the foregoing solution, the data quality of the second basic safety information packets is controlled, a second basic safety information packet that does not conform to the data quality criterion is discarded, and only a second basic safety information packet that conforms to the data quality criterion is reserved. Therefore, integrity and accuracy of the second basic safety information packets can be ensured.

In a possible implementation, performing sorting and queue management on the third basic safety information packets to obtain the first basic safety information packets includes constructing a basic safety information queue based on the third basic safety information packets, and performing sorting in the basic safety information queue according to predefined time and space sorting rules, to obtain the first basic safety information data.

In the foregoing solution, the basic safety information queue is constructed based on the third basic safety information packets, and sorting is performed in the basic safety information queue according to the predefined time and space sorting rules, to obtain the first basic safety information data. This helps to view and manage the first basic safety information data.

In a possible implementation, performing model processing on the first basic safety information data to obtain the map data includes obtaining a data model of basic safety information based on the first basic safety information data, obtaining, based on the data model, a basic safety information element corresponding to the first basic safety information data, where the basic safety information element includes geometric data, metadata, a safety data file, and an association relationship between the geometric data and the safety data file, and constructing the map data based on the basic safety information element.

In the foregoing solution, model processing is performed on the first basic safety information data, to convert the first basic safety information data into the basic safety information element for constructing the map data. Therefore, this helps to construct the map data, and makes a structure of the map data clear.

In a possible implementation, the method further includes determining a value of an association between second basic safety information data and the map data, where the second basic safety information data is basic safety information data obtained from a cloud server, and if the association value is greater than or equal to a preset threshold, updating the second basic safety information data based on the map data, or if the association value is less than the preset threshold, loading the map data into a local map database.

In the foregoing solution, the value of the association between the second basic safety information data and the map data is determined, and if the association value is greater than or equal to the preset threshold, the second basic safety information data is updated based on the map data, or if the association value is less than the preset threshold, the map data is loaded into the local map database. Therefore, the map data is updated in real time, and reliability of the map data is ensured.

In a possible implementation, the method further includes sending the map data to the cloud server such that the cloud server updates a cloud database.

In the foregoing solution, the map data is sent to the cloud server such that the cloud server updates the database. Therefore, this ensures synchronous data update between a vehicle end and cloud.

A second aspect of this application provides a map data construction method. The method is applied to a cloud server, and includes obtaining first basic safety information data, where the first basic safety information data includes parameter information of the vehicle and extended safety information, the parameter information of the vehicle is used to indicate a driving state and appearance information of the vehicle, and the extended safety information is used to indicate a safety state of the vehicle and a safety state of a road, and performing model processing based on the first basic safety information data to generate the map data.

In the foregoing solution, the first basic safety information data is obtained, and model processing is performed based on the first basic safety information data to generate the map data. The first basic safety information data includes the parameter information of the vehicle and the extended safety information such that the constructed map data not only includes the parameter information of the vehicle, but also includes the extended safety information. A self-driving vehicle may obtain some unsafe factors of the vehicle and the road based on the extended safety information, and plan and control vehicle behavior. This reduces some traffic accidents, and improves road traffic safety and stability.

In a possible implementation, performing model processing on the first basic safety information data to obtain the map data includes obtaining a data model of basic safety information based on the first basic safety information data, obtaining, based on the data model, a basic safety information element corresponding to the first basic safety information data, where the basic safety information element includes geometric data, metadata, a safety data file, and an association relationship between the geometric data and the safety data file, and constructing the map data based on the basic safety information element.

In the foregoing solution, model processing is performed on the first basic safety information data, to convert the first basic safety information data into the basic safety information element for constructing the map data. This helps to construct the map data, and makes a structure of the map data clear.

In a possible implementation, the method further includes updating a cloud database based on the map data.

In a possible implementation, the database includes a spatial database and a file database, and the updating the cloud database based on the map data includes storing the map data in the spatial database and the file database, where the spatial database stores a unique vehicle identifier (ID), the geometric data, and the metadata, the file database stores the safety data file, and the spatial database is associated with the file database using the metadata.

In the foregoing solution, the map data is stored in the spatial database and the file database, and the map data is stored in a classified manner for ease of storage and management.

In a possible implementation, the database includes a process database, a reality database, and a history database.

The process database is used to store the first basic safety information data.

The reality database is used to store the map data.

The history database is used to store all the map data that starts to be obtained at an initial moment.

In a possible implementation, updating a cloud database based on the map data includes obtaining a value of an association between the map data and the second basic safety information data, and if the association value is greater than or equal to a preset threshold, updating the reality database based on the map data, and loading the map data into the history database, or if the association value is less than the preset threshold, loading the map data into the reality database.

In the foregoing solution, the map data is managed and stored using three databases the process database, the reality database, and the history database. This facilitates query and management.

A third aspect of this application provides a vehicle terminal, including a sensing unit configured to obtain first basic safety information packets of a vehicle, where the first basic safety information packets include an information packet of the vehicle that is collected when a safety event occurs, a processing unit configured to obtain first basic safety information data from the first basic safety information packets, where the first basic safety information data includes parameter information of the vehicle and extended safety information, the parameter information of the vehicle is used to indicate a driving state and an appearance information of the vehicle, and the extended safety information is used to indicate a safety state of the vehicle and a safety state of a road, and an obtaining unit configured to perform model processing based on the first basic safety information data to generate the map data.

In a possible implementation, the processing unit includes a screening subunit configured to screen the first basic safety information packets in time domain and space domain to obtain second basic safety information packets, a quality control subunit configured to check data quality of the second basic safety information packets to obtain third basic safety information packets, and a queue control unit configured to perform sorting and queue management on the third basic safety information packets to obtain the first basic safety information data.

In a possible implementation, the filtering subunit is further configured to obtain position information of the vehicle and a current timestamp, and perform data filtering on the first basic safety information packets based on the position information of the vehicle, the current timestamp, a preset time range, and a preset space range, to obtain the second basic safety information packets.

In a possible implementation, the quality control subunit is further configured to check whether the second basic safety information packets conform to a data quality criterion, where the data quality criterion includes data integrity and data accuracy, and if the second basic safety information packets conform to the data quality criterion, output the third basic safety information packets based on a preset confidence value, or if the second basic safety information packets do not conform to the data quality criterion, discard the second basic safety information packets.

In a possible implementation, that the quality control subunit outputs the third basic safety information packets based on a preset confidence value includes calculating, by the quality control subunit, confidence values of the second basic safety information packets, and if the confidence values of the second basic safety information packets each are greater than or equal to the preset confidence threshold, using the second basic safety information packets as the third basic safety information packets, or if the confidence values of the second basic safety information packets each are less than the preset confidence threshold, discarding the second basic safety information packets.

In a possible implementation, the queue control unit is further configured to construct a basic safety information queue based on the third basic safety information packets, and perform sorting in the basic safety information queue according to predefined time and space sorting rules, to obtain the first basic safety information data.

In a possible implementation, the obtaining unit is further configured to obtain a data model of basic safety information based on the first basic safety information data, obtain, based on the data model, a basic safety information element corresponding to the first basic safety information data, where the basic safety information element includes geometric data, metadata, a safety data file, and an association relationship between the geometric data and the safety data file, and construct the map data based on the basic safety information element.

In a possible implementation, the vehicle terminal further includes a data management unit configured to determine a value of an association between second basic safety information data and the map data, where the second basic safety information data is basic safety information data obtained from a cloud server, and if the association value is greater than or equal to a preset threshold, update the second basic safety information data based on the map data, or if the association value is less than the preset threshold, load the map data into a local map database.

In a possible implementation, the vehicle terminal further includes a sending unit configured to send the map data to the cloud server such that the cloud server updates a cloud database.

For an implementation principle and a beneficial effect of each unit in the vehicle terminal provided in this embodiment, refer to the embodiment of the map data construction method provided in the first aspect. Details are not described herein again.

A fourth aspect of this application provides a server, including an obtaining unit configured to obtain first basic safety information data, where the first basic safety information data includes parameter information of the vehicle and extended safety information, the parameter information of the vehicle is used to indicate a driving state and appearance information of the vehicle, and the extended safety information is used to indicate a safety state of the vehicle and a safety state of a road, and a processing unit configured to perform model processing based on the first basic safety information data to generate the map data.

In a possible implementation, the processing unit is further configured to obtain a data model of basic safety information based on the first basic safety information data, obtain, based on the data model, a basic safety information element corresponding to the first basic safety information data, where the basic safety information element includes geometric data, metadata, a safety data file, and an association relationship between the geometric data and the safety data file, and construct the map data based on the basic safety information element.

In a possible implementation, the server further includes an updating unit configured to update a cloud database based on the map data.

In a possible implementation, the database includes a spatial database and a file database, and the updating unit is further configured to store the map data in the spatial database and the file database. The spatial database stores a unique vehicle ID, the geometric data, and the metadata, the file database stores the safety data file, and the spatial database is associated with the file database using the metadata.

In a possible implementation, the database includes a process database, a reality database, and a history database.

The process database is used to store the first basic safety information data.

The reality database is used to store the map data.

The history database is used to store all the map data that starts to be obtained at an initial moment.

In a possible implementation, the updating unit is further configured to obtain a value of an association between the map data and the second basic safety information data, and if the association value is greater than or equal to a preset threshold, update the reality database based on the map data, and load the map data into the history database, or if the association value is less than the preset threshold, load the map data into the reality database.

For an implementation principle and a beneficial effect of each unit in the server provided in this embodiment, refer to the embodiment of the map data construction method provided in the second aspect. Details are not described herein again.

A fifth aspect of this application provides a device, including a processor and a memory.

The memory is configured to store an instruction, and the processor is configured to execute the instruction stored in the memory. When the processor executes the instruction stored in the memory, the device is configured to perform the method in the first aspect or any embodiment of the second aspect.

A sixth aspect of this application provides a vehicle terminal, including at least one processing component (or chip) configured to perform the method in the first aspect or all implementations of the first aspect.

A seventh aspect of this application provides a server, including at least one processing component (or chip) configured to perform the method in the second aspect or all implementations of the second aspect.

An eighth aspect of this application provides a readable storage medium, and the readable storage medium stores an executable instruction. When at least one processor of a vehicle terminal executes the executable instruction, the vehicle terminal performs the map data construction method provided in the first aspect or all implementations of the first aspect.

A ninth aspect of this application provides a readable storage medium, and the readable storage medium stores an executable instruction. When at least one processor of a server executes the executable instruction, the server performs the map data construction method provided in the second aspect or all implementations of the second aspect.

A tenth aspect of this application provides a program product. The program product includes an executable instruction, and the executable instruction is stored in a readable storage medium. At least one processor of a vehicle terminal may read the executable instruction from the readable storage medium. When the at least one processor executes the executable instruction, the vehicle terminal is enabled to implement the map data construction method provided in the first aspect or all implementations of the first aspect.

An eleventh aspect of this application provides a program product. The program product includes an executable instruction, and the executable instruction is stored in a readable storage medium. At least one processor of a server may read the executable instruction from the readable storage medium. When the at least one processor executes the executable instruction, the server is enabled to implement the map data construction method provided in the second aspect or all implementations of the second aspect.

A twelfth aspect of this application provides a communications system, and the communications system includes the vehicle terminal and the server in the foregoing aspects.

DETAILED DESCRIPTION OF EMBODIMENTS

Figure 1:
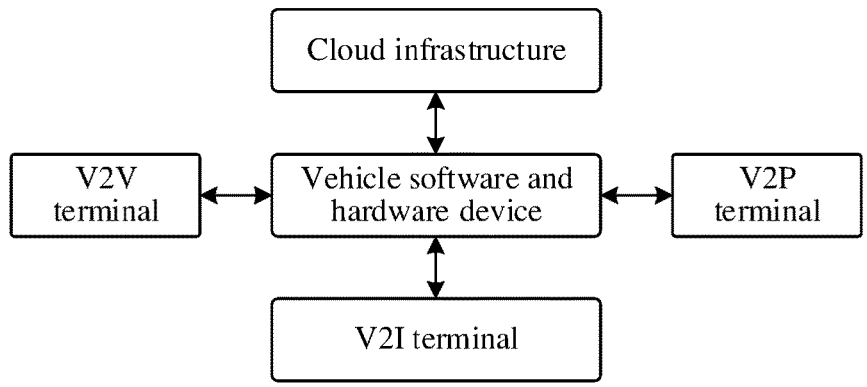
FIG. 1 is a schematic diagram of an application scenario of a map data construction method according to an embodiment of this application.

A map data construction method provided in this application is applied to a wireless communications system, and may be particularly applied to an internet of vehicles system. FIG. 1 is a schematic diagram of an application scenario of a map data construction method according to an embodiment of this application. As shown in FIG. 1, the scenario includes a vehicle software and hardware device, a cloud infrastructure, a vehicle-to-vehicle (V2V) terminal, a vehicle-to-pedestrian (V2P) terminal, and a vehicle-to-infrastructure (V2I) terminal.

Figure 2:
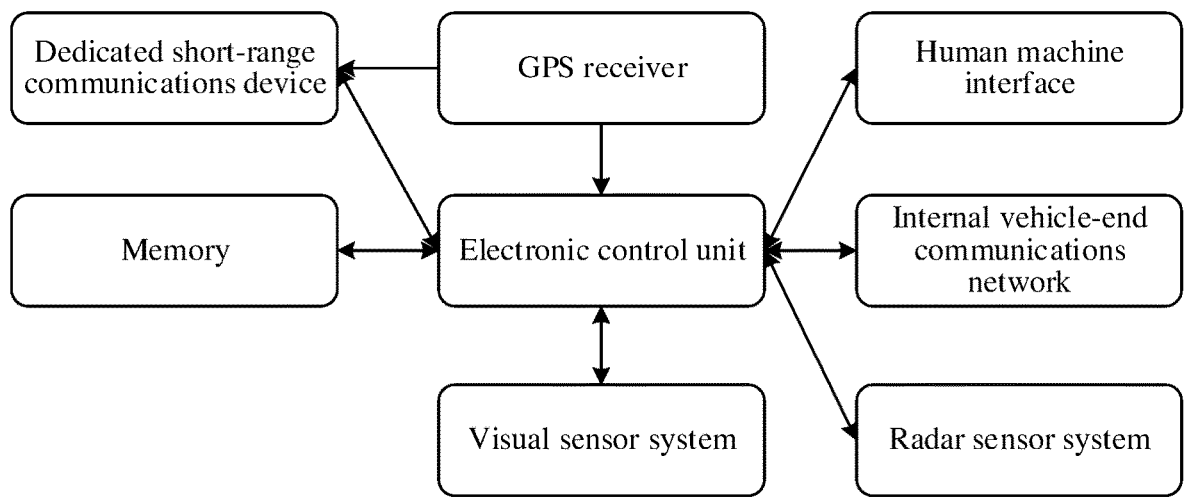
FIG. 2 is a schematic structural diagram of a vehicle software and hardware device according to an embodiment of this application.

FIG. 2 is a schematic structural diagram of the vehicle software and hardware device. The vehicle software and hardware device includes an electronic control unit, a dedicated short-range communications device, a Global Positioning System (GPS) receiver, a human machine interface, a memory, an internal vehicle-end communications network, a visual sensor system, and a radar sensor system. The electronic control unit is a running environment of a system, software, and an algorithm provided in this application. The dedicated short-range communications device exchanges data with an external V2X terminal using an antenna, and transmits data to the electronic control unit. The GPS receiver provides an accurate vehicle position and a time reference, and transmits data to the electronic control unit. The memory stores vehicle safety information, application data, and the like. The human machine interface is used for information exchange between a driver and a vehicle end application. All hardware components at the vehicle end are connected over the internal vehicle-end communications network. The visual sensor and the radar sensor each sense environmental parameters such as speeds of a vehicle and a surrounding vehicle, and use the environmental parameters as an input of the electronic control unit.

The cloud infrastructure includes a distributed storage device, a distributed computing array, and the like, and is configured to store and calculate a dynamic cloud map. The V2V terminal includes all other vehicle side communications systems and devices that exchange information with the system. The V2P terminal includes all handheld wireless communications devices of pedestrians that exchange information with the system. The V2I terminal includes all roadside communications facilities that exchange information with the system.

Figure 3:
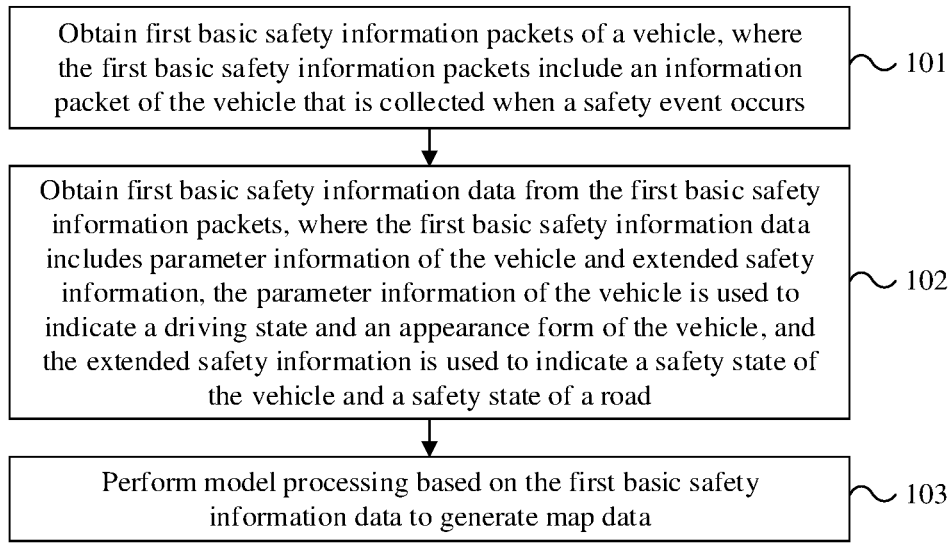
FIG. 3 is a flowchart of a map data construction method according to an embodiment of this application.

FIG. 3 is a flowchart of a map data construction method according to an embodiment of this application. The method is applied to a vehicle. As shown in FIG. 3, the method includes the following steps.

Step 101: Obtain first basic safety information packets of the vehicle, where the first basic safety information packets include an information packet of the vehicle that is collected when a safety event occurs.

In this embodiment, the safety event is a V2X safety event. For example, an event that a vehicle emergency hardware system outputs abnormal information or an event that a vehicle sensor senses a surrounding dangerous environment is the V2X safety event. When the safety event occurs, the vehicle may automatically obtain the first basic safety information packets. The first basic safety information packets each may include parameter information of the vehicle, such as a timestamp, and a position, a speed, an acceleration, a posture, and dimensions of the vehicle, and may further include information such as weather information, a vehicle state event, a historical track, and track prediction. For example, the vehicle identifies static environment information and dynamic obstacle information of a road in a specific distance using a visual/laser sensor, a GPS sensor locates the position of the vehicle, and a device in the vehicle identifies the static environment information of the road such as a lane border line, a limit line, a pedestrian crosswalk, a road turning flag, a road speed bump, a traffic signal light, and a traffic sign, and identifies the dynamic obstacle information of dynamic and static (non-permanent) obstacles such as pedestrians, non-motor vehicles, and motor vehicles that may affect vehicle driving.

Step 102: Obtain first basic safety information data from the first basic safety information packets, where the first basic safety information data includes the parameter information of the vehicle and extended safety information, the parameter information of the vehicle is used to indicate a driving state and an appearance information of the vehicle, and the extended safety information is used to indicate a safety state of the vehicle and a safety state of the road.

In this embodiment, screening, queue control, and the like may be performed on the first basic safety information packets to obtain the first basic safety information data. For example, screening processing may include time screening, space screening, and quality integrity and correctness screening, and the queue control may include temporal and spatial sorting of the first basic safety information packets.

Table 1 shows a format of a first basic safety information packet according to an embodiment of this application. As shown in Table 1, the first basic safety information packet includes two parts: Part-1 and Part-2. Part-1 is core data of the first basic safety information packet, including parameter information of a vehicle such as a timestamp, and a position, a speed, an acceleration, a posture, and dimensions of the vehicle. Part-2 is extended safety information of the first basic safety information packet, including information such as weather information, a vehicle state event, a historical track, and track prediction. When the V2X safety event occurs, the V2X safety event is added to Part-1 and then is sent in a broadcast form.

TABLE 1

| Part-1 | |
|---|---|
| Time | timestamp |
| Position | latitude |
| | longitude |
| | elevation |
| | positional accuracy |
| Vehicle state | speed |
| | Steering wheel angle |
| | heading |
| | longitudinal acceleration |
| | vertical acceleration |
| | lateral acceleration |
| | yaw rate |
| Vehicle dimensions | vehicle width |
| | vehicle height |
| Part-2 | |
| Extended safety information | hazard lights |
| | intersection stop line violation |
| | anti-lock braking system (ABS) activated |
| | traction control loss |
| | stability control activated |
| | hazardous materials |
| | emergency response |
| | hard braking |
| | lights changed |
| | wipers changed |
| | flat tire |
| | disabled vehicle |
| | path history/predicate |
| | radio data packet |
| | (RTCM) package |

It should be noted that, generally, when a V2X networking vehicle is running, the obtained first basic safety information includes only Part-1. When the V2X safety event occurs, the obtained first basic safety information includes the two parts: Part-1 and Part-2. A first basic safety information packet including only Part-1 is discarded during screening processing. Therefore, the first basic safety information packets that constitute the first basic safety information data each include the two parts: Part-1 and Part-2.

In this embodiment, the first basic safety information packets are screened and queued, and information in a first basic safety information packet that meets a condition constitutes the first basic safety information data. The first basic safety information data not only includes the parameter information of the vehicle, but also includes the extended safety information.

Step 103: Perform model processing based on the first basic safety information data to generate map data.

In this embodiment, model processing is performed on the first basic safety information data, and the first basic safety information data is converted into a format suitable for constructing the map data. The modeling processing may include processing such as data extraction, conversion, and management.

The map data constructed in this embodiment is complete basic safety information generated when all V2X safety events of a self-driving vehicle are stored and organized in a form of geographic information system (GIS) vector data. Therefore, this is essentially recording a discrete point vector map image layer of safety attributes of the self-driving vehicle, and the image layer may be used for road traffic safety analysis and self-driving vehicle safety.

According to the map data construction method provided in this embodiment of this application, when the safety event occurs, the first basic safety information packets of the vehicle are obtained, the first basic safety information data is obtained from the first basic safety information packets, and model processing is performed based on the first basic safety information data to generate the map data. The first basic safety information data includes the parameter information of the vehicle and the extended safety information such that the constructed map data not only includes the parameter information of the vehicle, but also includes the extended safety information. A self-driving vehicle may obtain some unsafe factors of the vehicle and the road based on the extended safety information, and plan and control vehicle behavior. In the method, a V2X network is applied to an automated driving system such that driving safety of the self-driving vehicle can be improved.

Figure 4:
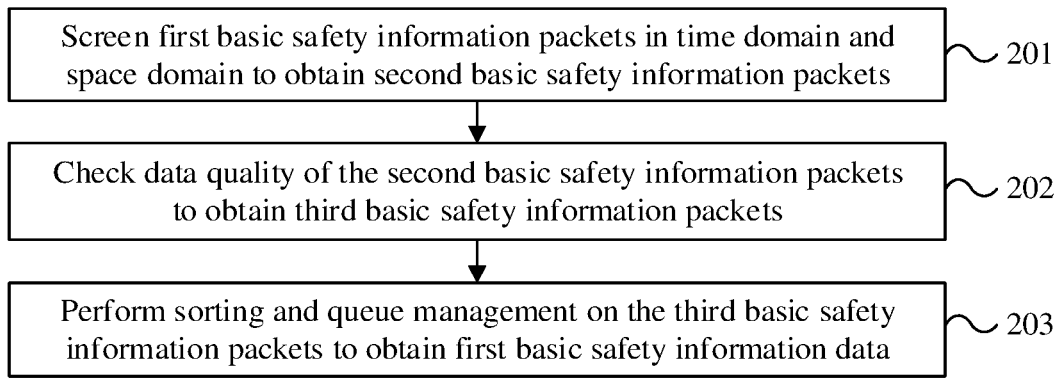
FIG. 4 is a flowchart of a map data construction method according to another embodiment of this application.

FIG. 4 is a flowchart of a map data construction method according to another embodiment of this application. As shown in FIG. 4, on the basis of the embodiment shown in FIG. 3, a specific implementation of step 102 may include the following step.

Step 201: Screen the first basic safety information packets in time domain and space domain to obtain second basic safety information packets.

In this embodiment, screening the first basic safety information packets in the time domain and the space domain is equivalent to that a spatial-temporal buffer is preset, spatial-temporal buffer analysis is performed on the first basic safety information packets, a first basic safety information packet falling beyond the spatial-temporal buffer is filtered out, and a first basic safety information packet in the spatial-temporal buffer is the second basic safety information packet.

Figure 5:
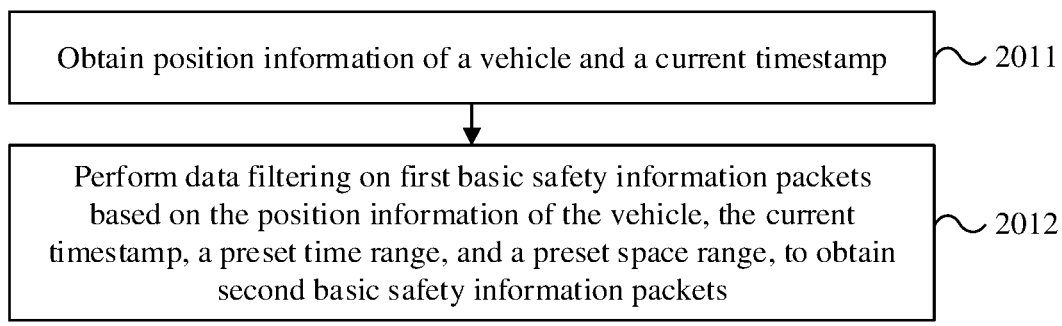
FIG. 5 is a flowchart of a map data construction method according to another embodiment of this application.

As shown in FIG. 5, an implementation of step 201 may include the following steps.

Step 2011: Obtain position information of the vehicle and a current timestamp.

In this embodiment, the position information of the vehicle and the current timestamp may be obtained using a GPS system.

Step 2012: Perform data filtering on the first basic safety information packets based on the position information of the vehicle, the current timestamp, a preset time range, and a preset space range, to obtain the second basic safety information packets.

In this embodiment, input information for screening the first basic safety information packets is the position information of the vehicle, the current timestamp, and the first basic safety information packets. A process of screening the first basic safety information packets is as follows. Using the position information of the vehicle as an origin of a space buffer and using the current timestamp as an origin of a time buffer, the spatial-temporal buffer is constructed using the preset space range and the preset time range, position information and time information are extracted from the first basic safety information packets, buffer analysis is performed on the first basic safety information packets based on the position information and the time information, data that is not in the buffer is discarded, and a first basic safety information packet in the buffer is reserved as the second basic safety information packet.

Figure 6:
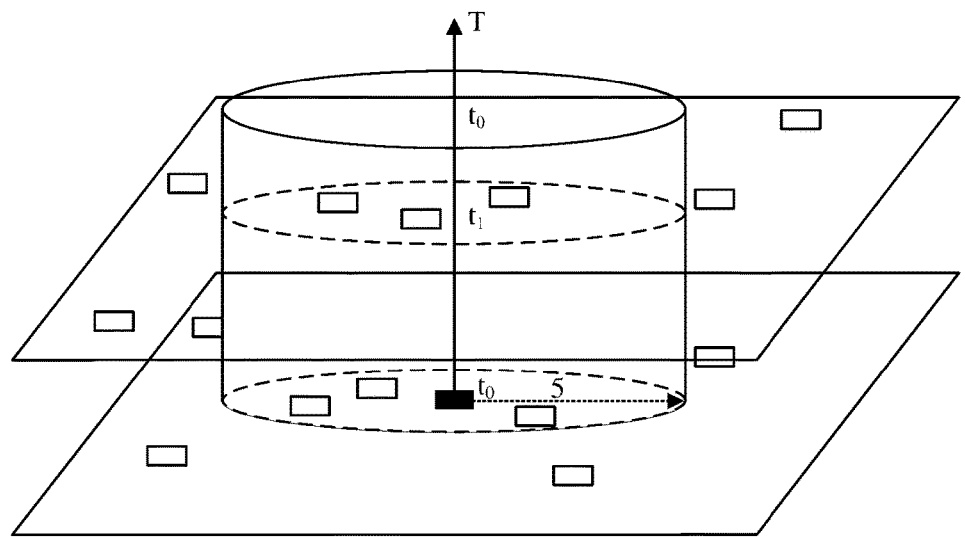
FIG. 6 is a schematic diagram of a spatial-temporal buffer according to this application.

FIG. 6 is a schematic diagram of a spatial-temporal buffer according to this application. As shown in FIG. 6, the position information of the vehicle represented by a black square is used as a point-area circle center, a predefined length s is used as a radius of the space buffer, for example, 200 meters (m), and |tn−t0| is used as a radius of the time buffer. Herein, t0 represents a current moment. A spatial-temporal cylinder, that is, the spatial-temporal buffer, is constructed. Spatial-temporal buffer analysis is performed based on the position information and the timestamp information in the first basic safety information packets, to filter out a first basic safety information packet falling beyond the cylinder, that is, a light gray block, and reserve a first basic safety information packet in the spatial-temporal buffer for subsequent analysis, that is, a deep gray block. Output information for performing data filtering on the first basic safety information packets is the first basic safety information packet in the spatial-temporal buffer.

Step 202: Check data quality of the second basic safety information packets to obtain third basic safety information packets.

In this embodiment, checking the data quality of the second basic safety information packets mainly includes performing integrity check, accuracy check, and confidence evaluation on the second basic safety information packets.

Figure 7:
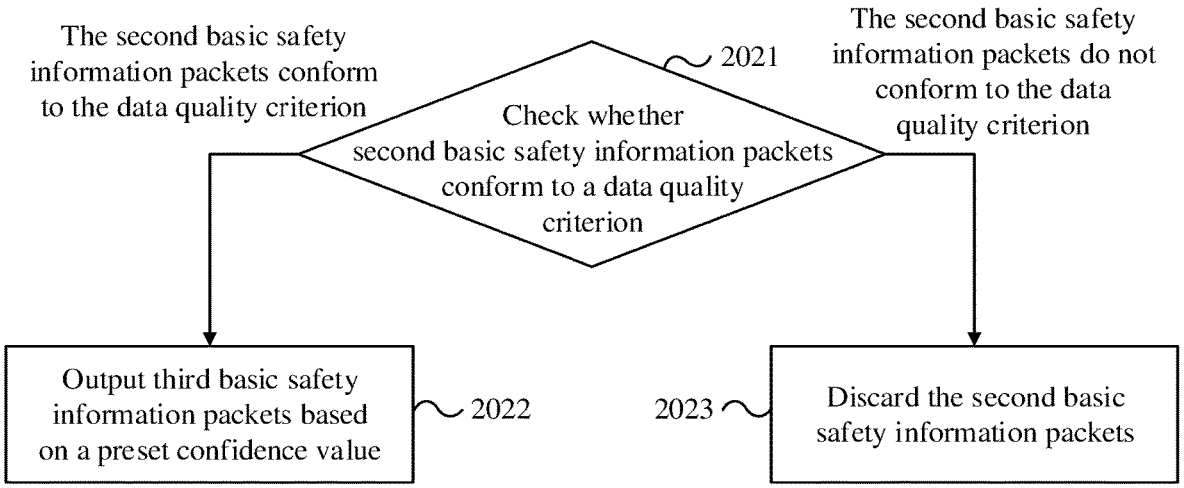
FIG. 7 is a flowchart of a map data construction method according to another embodiment of this application.

As shown in FIG. 7, an implementation of step 202 may include the following steps.

Step 2021: Check whether the second basic safety information packets conform to a data quality criterion, and if the second basic safety information packets conform to the data quality criterion, perform step 2022, or if the second basic safety information packets do not conform to the data quality criterion, perform step 2023.

The data quality criterion includes data integrity and data accuracy.

Checking the data integrity may include checking whether attribute field content, space information, time information, the extended safety information, and the like are missing. Particularly, checking integrity of the second basic safety information packet is mainly checking whether the second basic safety information packet includes the extended safety information, that is, whether the second basic safety information packet includes Part2 in Table 1. Checking the data accuracy may include checking whether an inaccurate attribute data type, length crossing, insufficient geometric precision of spatial data, a wrong topology relationship, or the like exists. It is considered that a second basic safety information packet that does not succeed in the integrity or accuracy check does not conform to the data quality criterion, and consequently the second basic safety information packet is directly discarded.

Step 2022: Output the third basic safety information packets based on a preset confidence value.

In this embodiment, confidence evaluation is performed on the second basic safety information packet that conforms to the data quality criterion, to output the third basic safety information packet.

Figure 8:
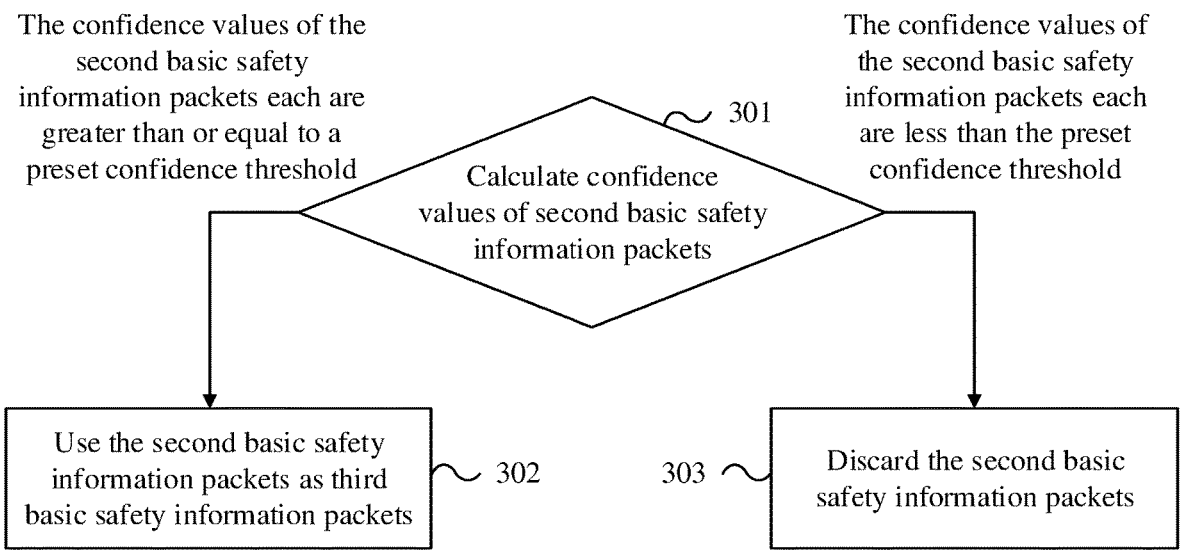
FIG. 8 is a flowchart of a map data construction method according to still another embodiment of this application.

In this embodiment, as shown in FIG. 8, an implementation of step 2022 includes the following step.

Step 301: Calculate confidence values of the second basic safety information packets, and if the confidence values of the second basic safety information packets each are greater than or equal to the preset confidence threshold, perform step 302, or if the confidence values of the second basic safety information packets each are less than the preset confidence thresholds, perform step 303.

In this embodiment, for the second basic safety information packet that conforms to the data quality criterion, a historical track point L={p1, p2, p3, . . . , and pn} in the second basic safety information packet and a current position p0 are used as an input for establishing a confidence evaluation model f of the second basic safety information packet. As shown in a formula (1), a confidence value V of second basic safety information packet is calculated, and is used as an important reference for a subsequently output third basic safety information packet:

$$V=f(L,p0) \quad (1).$$

Figure 9:
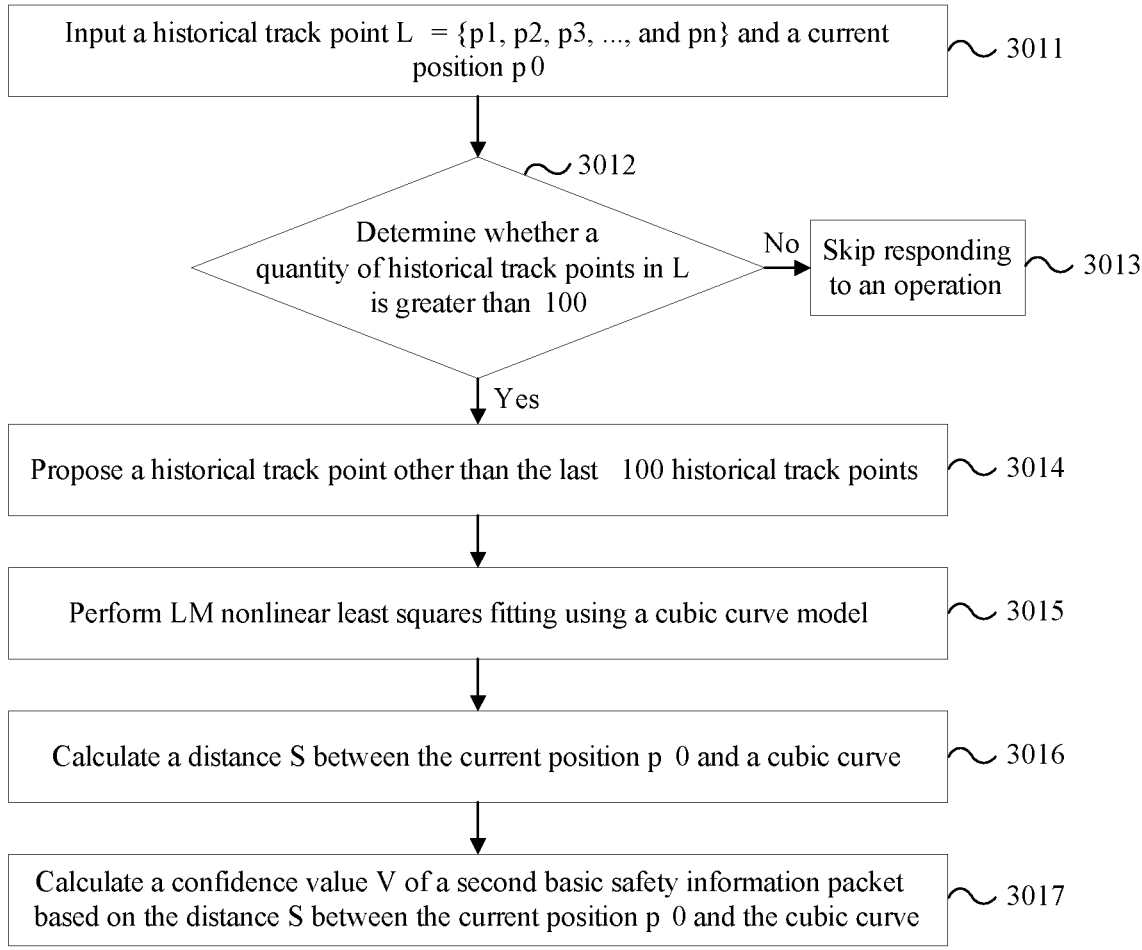
FIG. 9 is a flowchart of a map data construction method according to still another embodiment of this application.

FIG. 9 shows a procedure of calculating a confidence value of a second basic safety information packet using the formula (1).

Step 3011: Input the historical track point L={p1, p2, p3, . . . , and pn} and the current position p0.

Step 3012: Determine whether a quantity of historical track points in L is greater than 100, and if yes, perform step 3014, or if no, perform step 3013.

Step 3013: Skip responding to an operation.

Step 3014: Propose a historical track point other than the last 100 historical track points.

Step 3015: Perform LM nonlinear least squares fitting using a cubic curve model.

Step 3016: Calculate a distance S between the current position p0 and a cubic curve.

Step 3017: Calculate the confidence value V of the second basic safety information packet based on the distance S between the current position p0 and the cubic curve.

In this embodiment, for a point in the historical track point set L, last 100 points are selected in a time sequence. All point sets are selected when there are fewer than 100 points. A cubic curve "f(x)=a*x^3+b*x^2+c*x+d" is used as a nonlinear model to construct a condition equation. Nonlinear least squares fitting is performed using the Levenberg-Marquardt (LM) algorithm, the distance S between the current position $p_0$ and the cubic curve is calculated, and the confidence value V is calculated according to a formula (2):

$$V = \begin{cases} 0, s > 10 \\ (10-s)/10 \times 100\%, s \leq 10 \end{cases} \quad (2)$$

Step 302: Use the second basic safety information packets as the third basic safety information packets.

Step 303: Discard the second basic safety information packets.

In this embodiment, the second basic safety information packets are screened based on the preset confidence threshold. For example, a preset confidence empirical estimation value T is used as the confidence threshold. For example, T=95%. A second basic safety information packet whose confidence value V is less than T is directly discarded, and a second basic safety information packet whose confidence value V is greater than or equal to T is used as the third basic safety information packet for output.

Step 2023: Discard the second basic safety information packets.

Step 203: Perform sorting and queue management on the third basic safety information packets to obtain the first basic safety information data.

Figure 10:
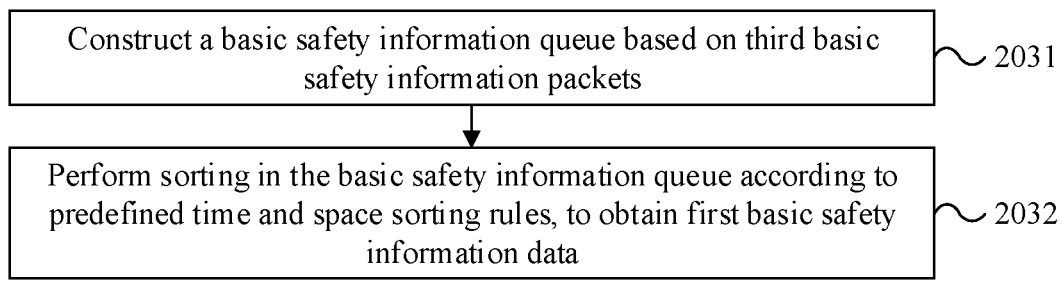
FIG. 10 is a flowchart of a map data construction method according to still another embodiment of this application.

In this embodiment, as shown in FIG. 10, an implementation of step 203 includes the following step.

Step 2031: Construct a basic safety information queue based on the third basic safety information packets.

In this embodiment, the basic safety information queue may be constructed based on ZEROMQ message middleware. The ZEROMQ is lightweight high-performance message middleware, and may be used to construct and manage a message queue.

Step 2032: Perform sorting in the basic safety information queue according to predefined time and space sorting rules, to obtain the first basic safety information data.

In this embodiment, sorting may be performed in the basic safety information queue in ascending order of distances from the vehicle position and in ascending order of distances from the current moment, and a basic safety information queue obtained after the sorting is incorporated into the message middleware for sequential storage. Subsequently, the first basic safety information data may be read and processed in descending order of priorities.

The first basic safety information data is a list of information sequentially sorted in two dimensions of time and space.

According to the map data construction method provided in this embodiment, the first basic safety information packets are screened in the time domain and the space domain to obtain the second basic safety information packets, the data quality of the second basic safety information packets is checked to obtain the third basic safety information packets, and sorting and queue management are performed on the third basic safety information packets to obtain the first basic safety information data. Therefore, data quality and reliability of the first basic safety information data are improved, and the first basic safety information data is sequentially managed.

Figure 11:
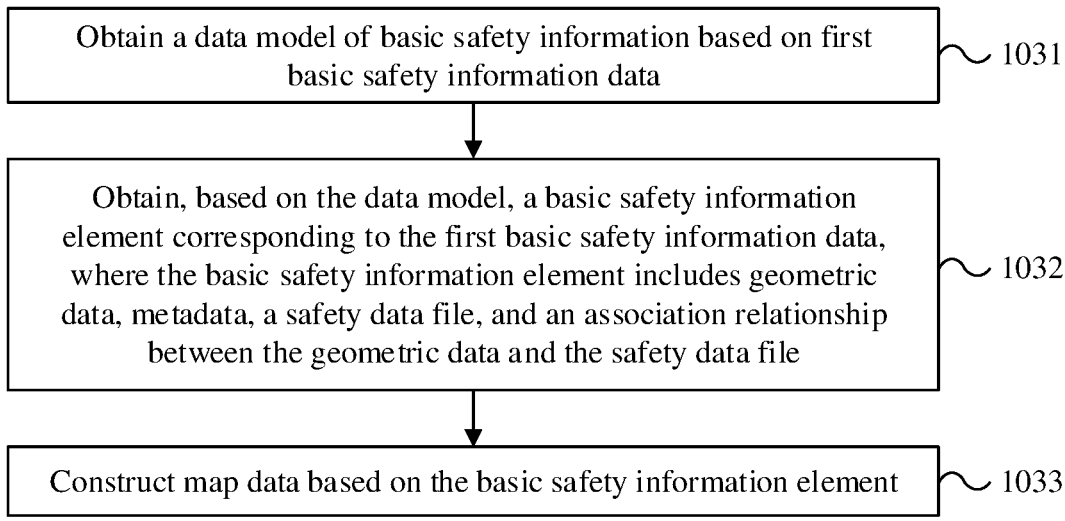
FIG. 11 is a flowchart of a map data construction method according to yet another embodiment of this application.

FIG. 11 is a flowchart of a map data construction method according to another embodiment of this application. As shown in FIG. 11, on the basis of any one of the foregoing embodiments, an implementation of step 103 includes the following steps.

Step 1031: Obtain a data model of basic safety information based on the first basic safety information data.

In this embodiment, information such as a timestamp, a vehicle position, a vehicle height, a vehicle speed, a lane line width, and an offset angle may be extracted from the first basic safety information data in a preset format, to generate the data model.

Compared with a conceptual expression in Table 1, the data model in Table 2 is a programmatic expression of the first basic safety information data. The data model includes member fields corresponding to information extracted from Part1 in Table 1 and file object members corresponding to information extracted from Part2 in Table 1. The file object members corresponding to the information extracted from Part2 each are in a form of a non-structured binary file.

Step 1032: Obtain, based on the data model, a basic safety information element corresponding to the first basic safety information data, where the basic safety information element includes geometric data, metadata, a safety data file, and an association relationship between the geometric data and the safety data file.

In this embodiment, the first basic safety information data is converted using the data model in step 1031 as an input, to output the basic safety information element corresponding to the first basic safety information data. The data model is a data structure obtained after the first basic safety information data is converted 3. Compared with a model initialization expression of the first basic safety information, the basic safety information element is a further normalization expression of the data model of the first basic safety information data. The basic safety information element corresponding to the first basic safety information data is output. That is, the basic safety information element is an expression form of a binary series indexing (BSI) feature structure. Each member field in a structure of Part1 of the data model is converted into a geometry sub structure and a metadata sub structure of the BSI feature structure. A file object member field in a structure of Part2 of the data model is converted into a file sub structure of the BSI Feature feature structure.

Step 1033: Construct the map data based on the basic safety information element.

In this embodiment, the basic safety information elements corresponding to a plurality of pieces of first basic safety information data are stored in a database to construct the map data.

In this embodiment, the data model of the basic safety information is obtained based on the first basic safety information data, the basic safety information element corresponding to the first basic safety information data is obtained based on the data model, and the map data is constructed based on the basic safety information element. The basic safety information element includes the geometric data, the metadata, the safety data file, and the association relationship between the geometric data and the safety data file such that the self-driving vehicle can quickly obtain the parameter information of the vehicle and the extended safety information from the map data, and plan and control vehicle behavior. This reduces traffic accidents and avoids losses.

Figure 12:
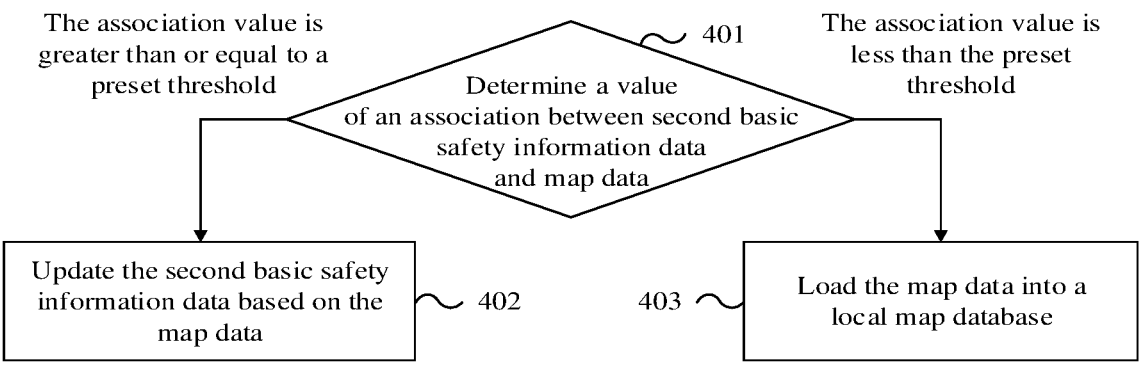
FIG. 12 is a flowchart of a map data construction method according to yet another embodiment of this application.

FIG. 12 is a flowchart of a map data construction method according to yet another embodiment of this application. On the basis of any one of the foregoing embodiments, after the map data is obtained, the map data further needs to be stored and managed. As shown in FIG. 12, the map data construction method may further include the following steps.

Step 401: Determine a value of an association between second basic safety information data and the map data, and if the association value is greater than or equal to a preset threshold, perform step 402, or if the association value is less than the preset threshold, perform step 403.

The second basic safety information data is basic safety information data obtained from a cloud server.

In this embodiment, storing and managing the map data includes dynamically updating the map data, and loading the map data into a database. The value of the association between the second basic safety information data and the map data is determined, and if the association value is greater than or equal to the preset threshold, the map data is dynamically updated, or if the association value is less than the preset threshold, the map data is loaded into the database.

Step 402: Update the second basic safety information data based on the map data.

In this embodiment, updating the map data means that an SQLITE database is updated using the dynamic map data obtained in real time. That is, offline second basic safety information data downloaded by a vehicle from cloud is updated.

Step 403: Load the map data into a local map database.

In this embodiment, loading the map data into the database means that the dynamic map data obtained in real time is inserted into the SQLITE database, and the map data is loaded into a map database at a vehicle end. In addition, a file system is created, and is loaded into a map file system at the vehicle end.

In this embodiment, updating a dynamic map at the vehicle end and loading the dynamic map into the database includes updating the map data and an index, loading geometric data and metadata into a spatial database, loading a data file into a file database, and the like. In addition, a geometric attribute data storage engine of the map data is constructed at the vehicle end based on the SQLITE database.

For automated driving from A to B, a passenger enters coordinates of a start point A and coordinates of an end point B using the human machine interface shown in FIG. 1. After receiving a person-vehicle interaction request, an automated driving system running in an electronic control unit starts an automated driving task. The automated driving system includes an automated driving and dynamic map layer construction system provided in this application.

Before the automated driving task starts, a dynamic map table of basic safety information in the SQLITE spatial database is loaded into a dynamic map layer of basic safety information of cloud in an offline manner in a specific spatial-temporal range, for example, in a range of 10 km in terms of space and 1 h in terms of time.

When the automated driving task is performed, data in an existing dynamic map table is compared with a confidence value and a unique vehicle ID of map metadata obtained after data conversion. If associated data is found, a record corresponding to the existing dynamic map table is updated, or if no associated data is found, geometric data and metadata of the converted basic safety information map are loaded into a data table corresponding to the SQLITE for persistent storage. Each basic safety information message corresponds to a database table record. A B-tree index is constructed for an ID (a unique ID of the basic safety information message) attribute, a vehicle_id (a unique ID of a self-driving car) attribute, and a timestamp (a timestamp of the basic safety information message) attribute, and an R-tree space index is constructed for geometry. After extended safety information (part 2) of the basic safety information is sequenced, the extended safety information is permanently stored in a local file system of a vehicle end operating system, and a storage path is stored in the SQLITE data table in a form of metadata.

Figure 13:
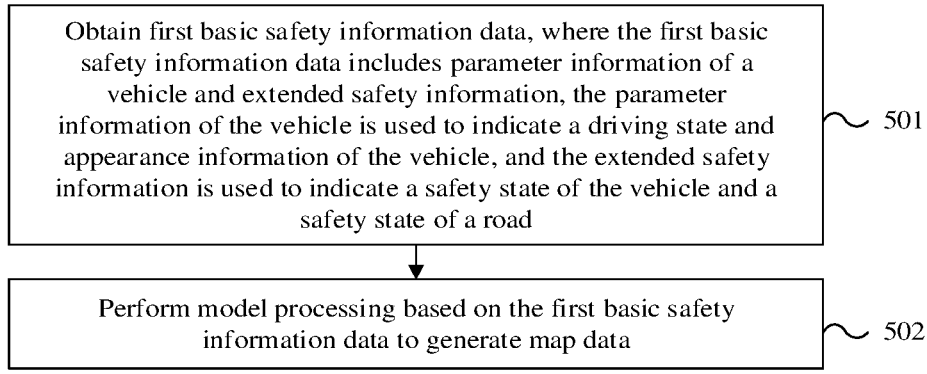
FIG. 13 is a flowchart of a map data construction method according to still yet another embodiment of this application.

FIG. 13 is a flowchart of a map data construction method according to still yet another embodiment of this application. The method is applied to a cloud server. As shown in FIG. 13, the method includes the following steps.

Step 501: Obtain first basic safety information data, where the first basic safety information data includes parameter information of a vehicle and extended safety information, the parameter information of the vehicle is used to indicate a driving state and appearance information of the vehicle, and the extended safety information is used to indicate a safety state of the vehicle and a safety state of a road.

In this embodiment, the first basic safety information data is reported by a vehicle end in real time. A method process in which a vehicle end obtains first basic safety information data is described in detail in the foregoing embodiments. Details are not described herein again.

Step 502: Perform model processing based on the first basic safety information data to generate map data.

In this embodiment, model processing is performed on the first basic safety information data, to convert the first basic safety information data into a format suitable for constructing the map data. The modeling processing may include processing such as data extraction, conversion, and management.

According to the map data construction method provided in this embodiment, the first basic safety information data is obtained, and model processing is performed on the first basic safety information data to obtain the map data. The first basic safety information data includes the parameter information of the vehicle and the extended safety information such that the constructed map data not only includes the parameter information of the vehicle, but also includes the extended safety information. A self-driving vehicle may obtain some unsafe factors of the vehicle and the road based on the extended safety information, and plan and control vehicle behavior. This reduces some traffic accidents, and improves road traffic safety and stability.

Optionally, in the embodiment shown in FIG. 13, a specific implementation of step 502 is the same as a method for obtaining map data by a vehicle end. For details, refer to the embodiment shown in FIG. 11. Details are not described herein again.

Optionally, on the basis of the embodiment shown in FIG. 13, the map data construction method may further include updating a cloud database based on the map data.

Optionally, the database includes a spatial database and a file database, and the updating a cloud database based on the map data includes storing the map data in the spatial database and the file database. The spatial database stores a unique vehicle ID, the geometric data, and the metadata, the file database stores the safety data file, and the spatial database is associated with the file database using the metadata.

Figure 14:
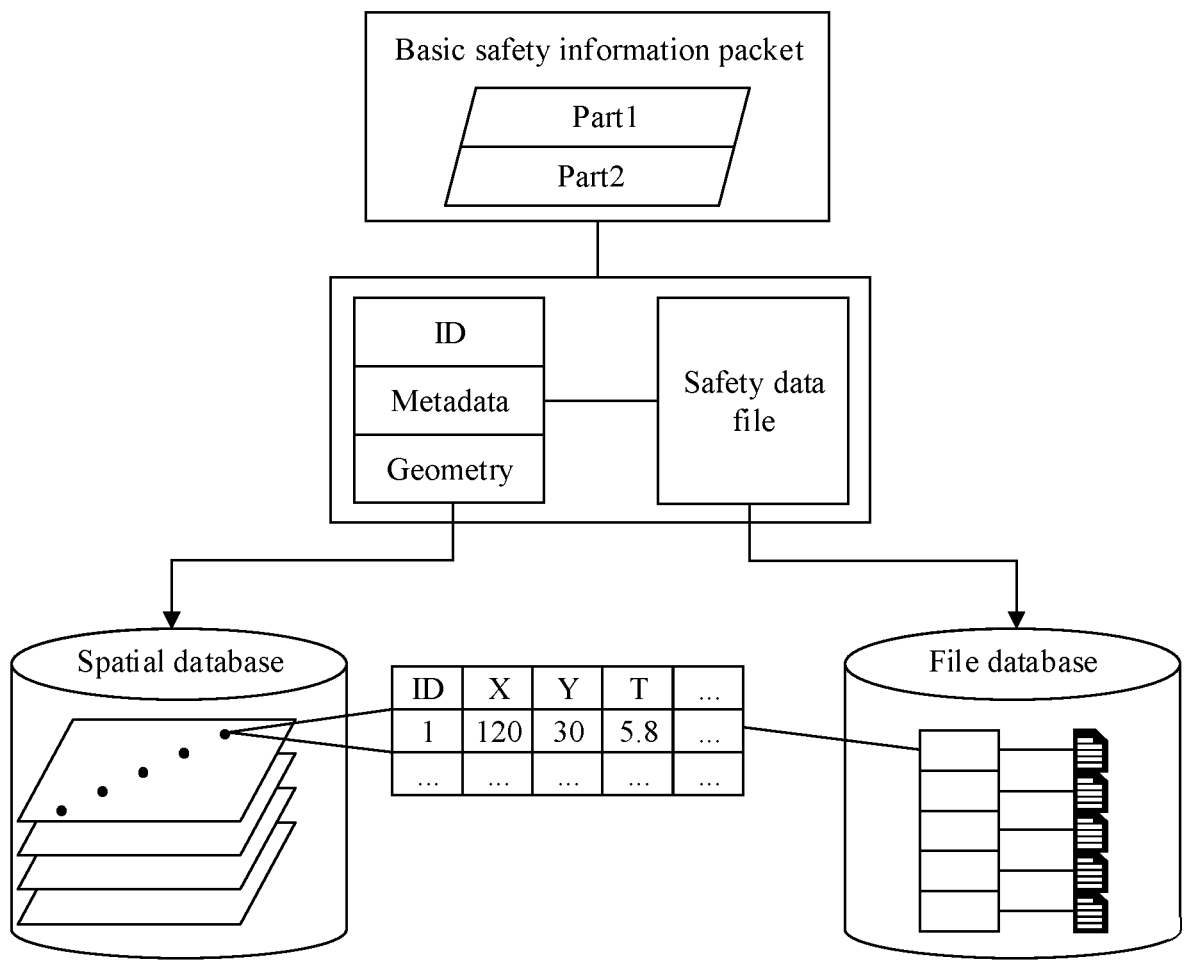
FIG. 14 is a schematic diagram of a data storage method according to an embodiment of this application.

FIG. 14 is a schematic diagram of a data storage method according to an embodiment of this application. In this embodiment, through extraction, conversion, loading, and the like, original data of a first basic safety information packet is converted into basic elements of dynamic map data, that is, geometric data, metadata, and an extended safety data file, mutual association relationship between the basic elements is established, and finally the basic elements are sequenced and permanently stored in a spatial database and a file system that are of a corresponding structure, to construct the dynamic map data. As shown in FIG. 14, a unique vehicle ID, the metadata, and the geometric data are extracted from Part1 of first basic safety information, and are sequenced into a relational spatial database for storage. A safety data file is extracted from Part2 and is sequenced into a file database for storage. The spatial database is associated with the file database using the metadata. For data in the spatial database, each first basic safety information packet corresponds to one database table row record. The metadata such as indexes of an ID, a vehicle position, and a state in Part1 of the first basic safety information packet, and an index of a file in Part2 in the corresponding file database i stored. The indexes are used to implement association between the two parts of basic safety information data.

Optionally, the database includes a process database, a reality database, and a history database. The process database is used to store the first basic safety information data. The reality database is used to store the map data. The history database is used to store all map data that starts to be obtained at an initial moment.

In this embodiment, updating dynamic cloud map data and loading the dynamic cloud map data into the database include updating the reality database, loading historical data into the history database, and the like. Updating the dynamic cloud map data means that the reality database is updated using data in the cloud process database, and data associated with the reality database is updated. Loading the dynamic cloud map data into the database means that data in the cloud process database is loaded into the reality database for storage, and data in the reality database is loaded into the history database for persistent storage.

Figure 15:
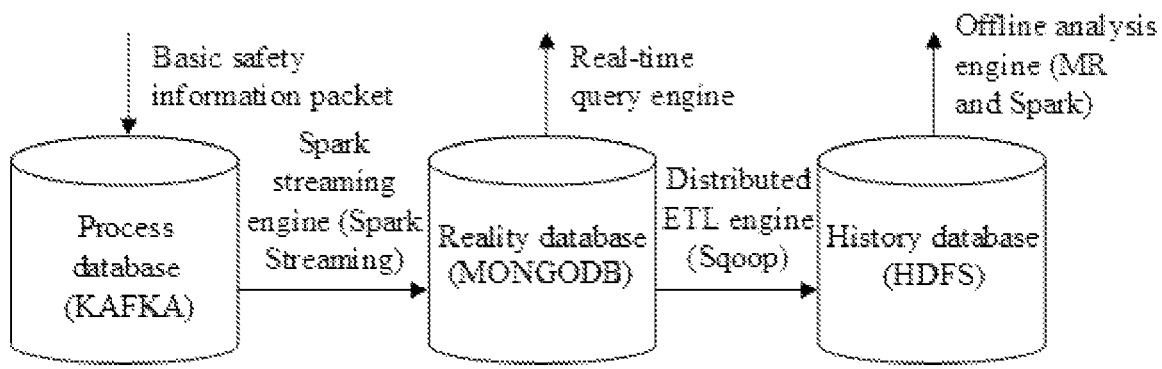
FIG. 15 is a schematic diagram of another data storage method according to an embodiment of this application.

FIG. 15 is a schematic diagram of another data storage method according to an embodiment of this application. As shown in FIG. 15, a map data system including a process database, a reality database, and a history database is constructed in cloud to store and manage geometric information, attribute information, and a data file of dynamic map data.

Functions of the three databases are as follows. The process database receives and temporarily stores first basic safety information data sent by a V2X terminal to the cloud, and the database is implemented as KAFKA distributed message middleware. The reality database stores dynamic map data that is in full space domain within a specific time range (for example, one day) and that is associated with a real world, and the database is implemented as a MONGODB distributed NoSQL database. The history database stores all historical dynamic map data, and is further implemented as HADOOP Distributed File System (HDFS).

In the cloud, the KAFKA distributed message middleware receives, in real time, the first basic safety information data sent by the V2X terminal. A spark streaming engine performs processing such as data quality check, extraction, and conversion on the received first basic safety information data in real time, and compares data in an existing MONGODB table with a confidence value and a unique vehicle ID of dynamic map metadata obtained after conversion. If associated data is found, a record corresponding to the existing dynamic map table is updated, and corresponding historical data is loaded into a distributed file system of the history database in batches in a specific time period using a distributed ETL engine Sqoop, or if no associated data is found, geometric data and metadata of the converted map data are loaded into a corresponding data table of the MONGODB for persistent storage.

The MONGODB uses a Key-Value architecture. Herein, "Key" is designed as a combination of the metadata, including a message ID, a vehicle ID, a timestamp, and a space position, and "Value" is designed as a document including another metadata item and extended safety information. Data in the reality database is queried in real time based on an efficient MONGODB key index, and data support is continuously provided for each V2X terminal using high concurrency and high availability features of the distributed system. Historical dynamic map data in the history database is efficiently analyzed based on distributed external memory and memory computing frameworks of MapReduce and Spark, to efficiently analyze the historical dynamic map data. More specific road traffic safety information is mined based on the extended safety information, to provide richer behavior planning and control support for a vehicle end.

Figure 16:
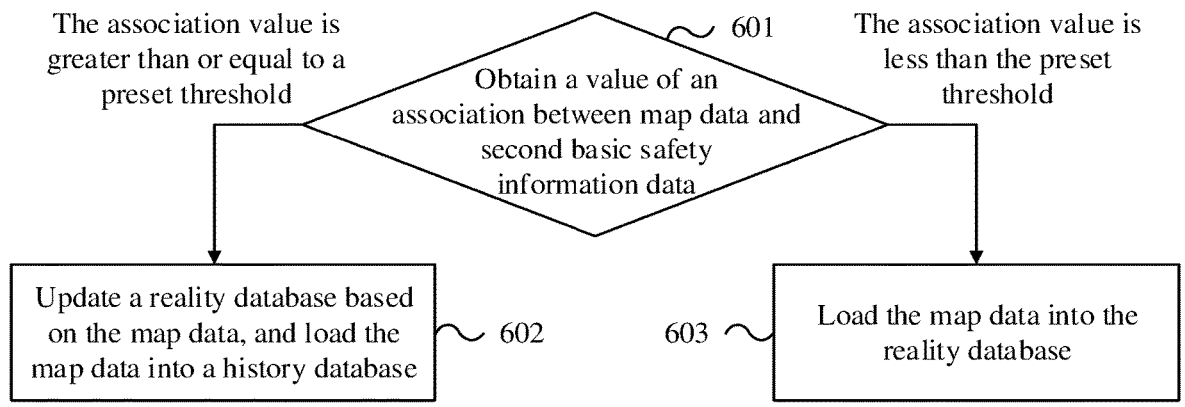
FIG. 16 is a flowchart of a map data construction method according to still yet another embodiment of this application.

In this embodiment, as shown in FIG. 16, a specific implementation of the step of "updating a cloud database based on the map data" includes the following steps.

Step 601: Obtain a value of an association between the map data and second basic safety information data, that is, a data space proximity, and if the association value is greater than or equal to a preset threshold, perform step 602, or if the association value is less than the preset threshold, perform step 603.

Step 602: Update the reality database based on the map data, and load the updated map data into the history database.

Step 603: Load the map data into the reality database.

In this embodiment, the value of the association between the map data and the second basic safety information data is obtained, and if the association value is greater than or equal to the preset threshold, the reality database is updated based on the map data, and the map data is loaded into the history database, or if the association value is less than the preset threshold, the map data is loaded into the reality database, to update and sequentially manage the database.

Figure 17:
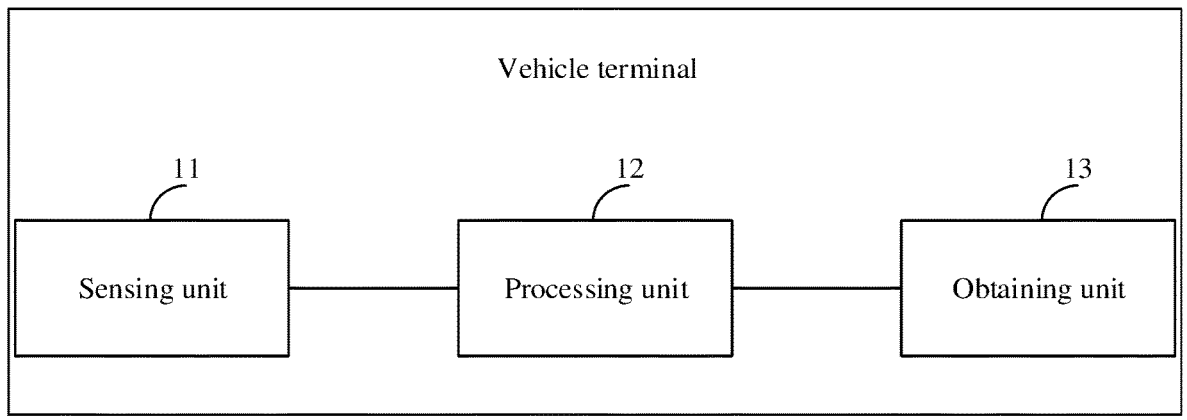
FIG. 17 is a block diagram of a vehicle terminal according to an embodiment of this application.

FIG. 17 is a block diagram of a vehicle terminal according to an embodiment of this application. As shown in FIG. 17, the vehicle terminal includes a sensing unit 11, a processing unit 12, and an obtaining unit 13.

The sensing unit 11 is configured to obtain first basic safety information packets of a vehicle. The first basic safety information packets include an information packet of the vehicle that is collected when a safety event occurs.

In this embodiment, the sensing unit 11 may include a vehicle sensing system module and an internet of vehicles module. The vehicle sensing system module is a GPS, a safety control unit, a visual sensor, a laser sensor, and the like. The internet of vehicles module is a V2V/V2P/V2I module and the like.

The processing unit 12 is configured to obtain first basic safety information data from the first basic safety information packets. The first basic safety information data includes parameter information of the vehicle and extended safety information, the parameter information of the vehicle is used to indicate a driving state and an appearance information of the vehicle, and the extended safety information is used to indicate a safety state of the vehicle and a safety state of a road.

The obtaining unit 13 is configured to perform model processing based on the first basic safety information data to generate map data.

Figure 18:
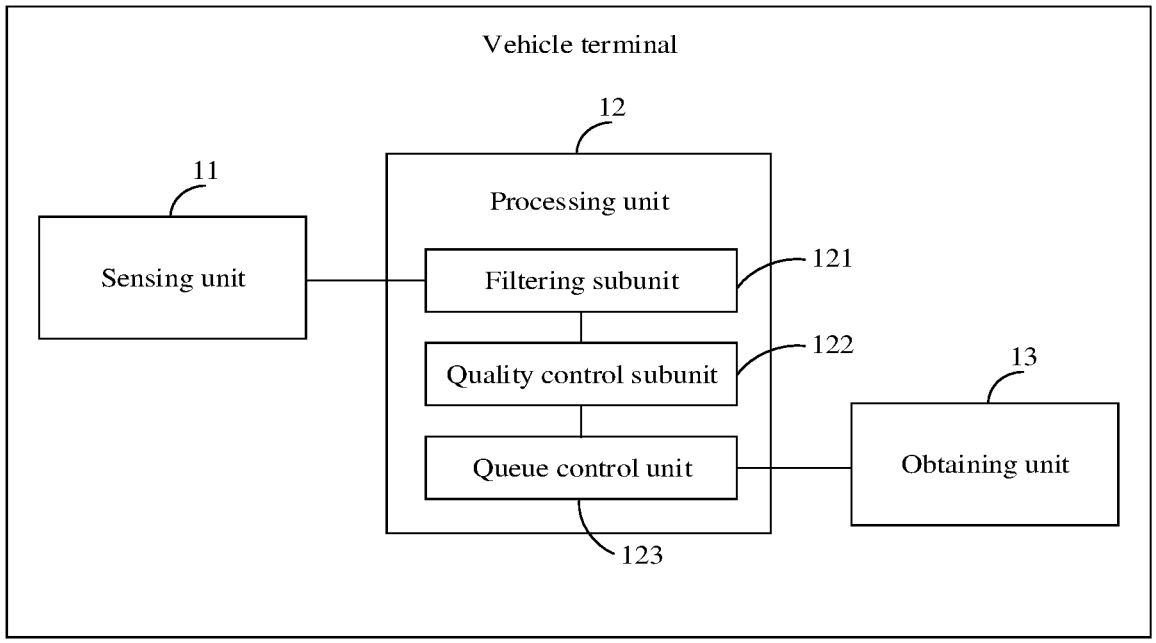
FIG. 18 is a block diagram of a vehicle terminal according to another embodiment of this application.

FIG. 18 is a block diagram of a vehicle terminal according to another embodiment of this application. As shown in FIG. 18, the processing unit 12 includes a filtering subunit 121, a quality control subunit 122, and a queue control unit 123.

The filtering subunit 121 is configured to screen the first basic safety information packets in time domain and space domain to obtain second basic safety information packets.

In this embodiment, the filtering subunit 121 filters, in filtering rules of several dimensions such as time, space, and an attribute, first basic safety information packets of the vehicle and another vehicle that are sent by the sensing unit (the vehicle sensing system and the internet of vehicles system) in real time.

The quality control subunit 122 is configured to check data quality of the second basic safety information packets to obtain third basic safety information packets.

In this embodiment, the quality control subunit 122 calculates quality levels of the second basic safety information packets based on structure specifications of the second basic safety information packets, a communication protocol specification of a dedicated short-range communications technology, and a confidence evaluation model, and discards data that does not meet a quality requirement.

The queue control unit 123 is configured to perform sorting and queue management on the third basic safety information packets to obtain the first basic safety information data.

In this embodiment, the queue control unit 123 sorts the third basic safety information packets in two dimensions of time and space, and creates a priority queue to implement effective packet sorting based on priorities.

Figure 19:
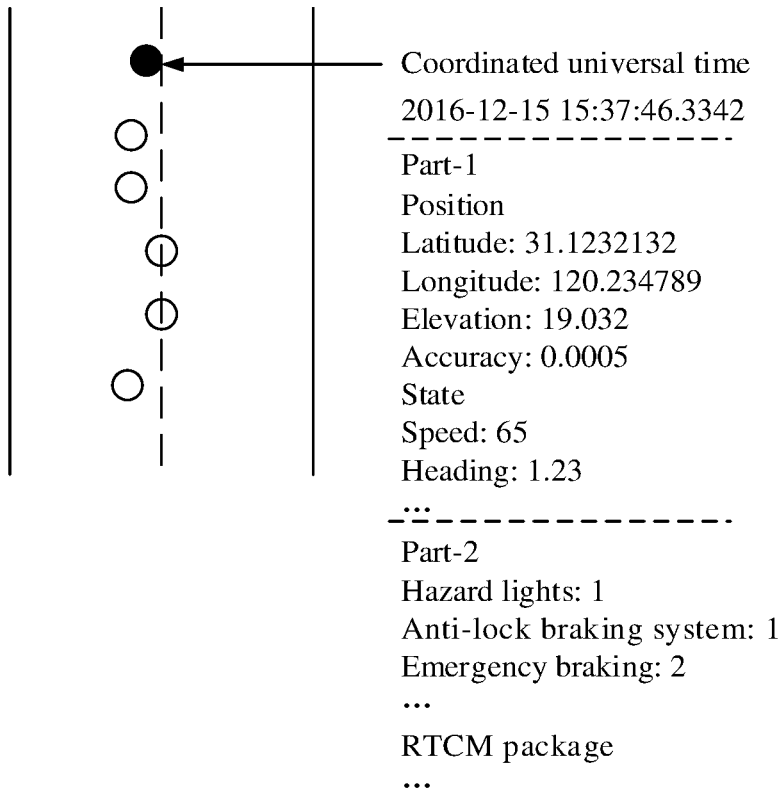
FIG. 19 shows a format of first basic safety information data according to this application.

In this embodiment, the first basic safety information data is formed after operations such as filtering, quality control, and queue control are performed on the first basic safety information packets. FIG. 19 shows a format of first basic safety information data according to this application. As shown in FIG. 19, information from top to bottom is as follows.

Timestamp for recording a first row of basic safety information packets: The timestamp is a coordinated universal time.

Part of data in basic safety information Part-1: The data includes basic vehicle information such as a vehicle position and a vehicle state. The vehicle position includes information such as latitude, longitude, an elevation, and accuracy. The vehicle state includes information such as a speed and heading.

Part of data in basic safety information Part-2: The data includes vehicle safety information extension data such as a hazard light, an ABS, emergency braking (HardBraking), and an RTCM package. This part of data is a core composition of a dynamic map layer, and only basic safety information including Part-2 is used for map construction.

Optionally, the filtering subunit 121 is further configured to obtain position information of the vehicle and a current timestamp, perform data filtering on the first basic safety information packets based on the position information of the vehicle, the current timestamp, a preset time range, and a preset space range, to obtain the second basic safety information packets.

Optionally, the quality control subunit 122 is further configured to check whether the second basic safety information packets conform to a data quality criterion, where the data quality criterion includes data integrity and data accuracy, and if the second basic safety information packets conform to the data quality criterion, output the third basic safety information packets based on a preset confidence value, or if the second basic safety information packets do not conform to the data quality criterion, discard the second basic safety information packets.

Optionally, the quality control subunit 122 outputs the third basic safety information packets based on the preset confidence value. Further, the quality control subunit 122 calculates confidence values of the second basic safety information packets, and if the confidence values of the second basic safety information packets each are greater than or equal to the preset confidence threshold, uses the second basic safety information packets as the third basic safety information packets, or if the confidence values of the second basic safety information packets each are less than the preset confidence threshold, discards the second basic safety information packets.

Optionally, the queue control unit 123 is further configured to construct a basic safety information queue based on the third basic safety information packets, and perform sorting in the basic safety information queue according to predefined time and space sorting rules, to obtain the first basic safety information data.

Optionally, the obtaining unit 13 is further configured to obtain a data model of basic safety information based on the first basic safety information data, obtain, based on the data model, a basic safety information element corresponding to the first basic safety information data, where the basic safety information element includes geometric data, metadata, a safety data file, and an association relationship between the geometric data and the safety data file, and construct the map data based on the basic safety information element.

In this embodiment, the first basic safety information data is extracted and converted based on a basic safety information data structure specification. Spatial geometric data and metadata are extracted from Part1, and a binary data file is extracted from Part2 in order to constitute a basic data structure of a dynamic map of basic safety information.

Figure 20:
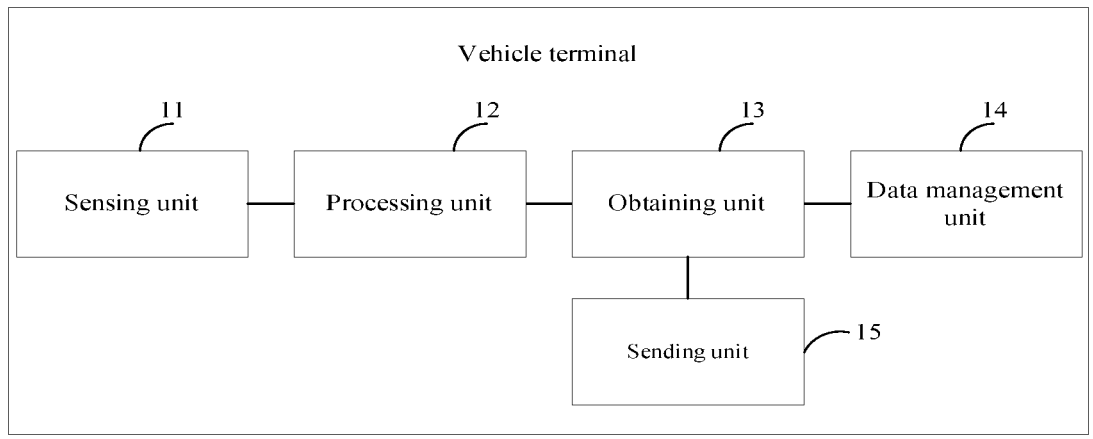
FIG. 20 is a block diagram of a vehicle terminal according to another embodiment of this application.

FIG. 20 is a block diagram of a vehicle terminal according to another embodiment of this application. As shown in FIG. 20, the vehicle terminal further includes a data management unit 14.

The data management unit 14 is configured to determine a value of an association between second basic safety information data and the map data, where the second basic safety information data is basic safety information data obtained from a cloud server, and if the association value is greater than or equal to a preset threshold, update the second basic safety information data based on the map data, or if the association value is less than the preset threshold, load the map data into a local map database.

In this embodiment, after the map data is dynamically compared with the second basic safety information data downloaded from cloud by the vehicle, associated data is updated and re-indexed, and unassociated data is directly loaded into a spatial database and a file database at a vehicle end.

Optionally, as shown in FIG. 20, the vehicle terminal further includes a sending unit 15.

The sending unit 15 is configured to send the map data to the cloud server such that the cloud server updates a cloud database.

For detailed descriptions of implementation principles and beneficial effects of the vehicle terminal provided in this embodiment of this application, refer to the method embodiments in FIG. 3 to FIG. 12. Details are not described herein again.

Figure 21:
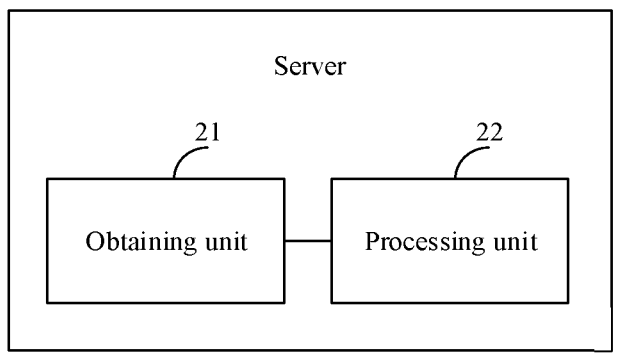
FIG. 21 is a block diagram of a server according to an embodiment of this application.

FIG. 21 is a block diagram of a server according to an embodiment of this application. As shown in FIG. 21, the server includes an obtaining unit 21 configured to obtain first basic safety information data, where the first basic safety information data includes parameter information of a vehicle and extended safety information, the parameter information of the vehicle is used to indicate a driving state and appearance information of the vehicle, and the extended safety information is used to indicate a safety state of the vehicle and a safety state of a road, and a processing unit 22 configured to perform model processing based on the first basic safety information data to generate map data.

Optionally, the processing unit 22 is further configured to obtain a data model of basic safety information based on the first basic safety information data, obtain, based on the data model, a basic safety information element corresponding to the first basic safety information data, where the basic safety information element includes geometric data, metadata, a safety data file, and an association relationship between the geometric data and the safety data file, and construct the map data based on the basic safety information element.

In this embodiment, the first basic safety information data is extracted and converted based on a basic safety information data structure specification. Spatial geometric data and metadata are extracted from Part1, and a binary data file is extracted from Part2 in order to constitute a basic data structure of dynamic map data. Alternatively, the map data may be compared with a reality database in which cloud stores current dynamic map data, associated data in the reality database is updated, and historical data is sequenced in a distributed file system for persistent storage and big data analysis. If there is no associated data, data in a process database is directly loaded into the reality database.

Figure 22:
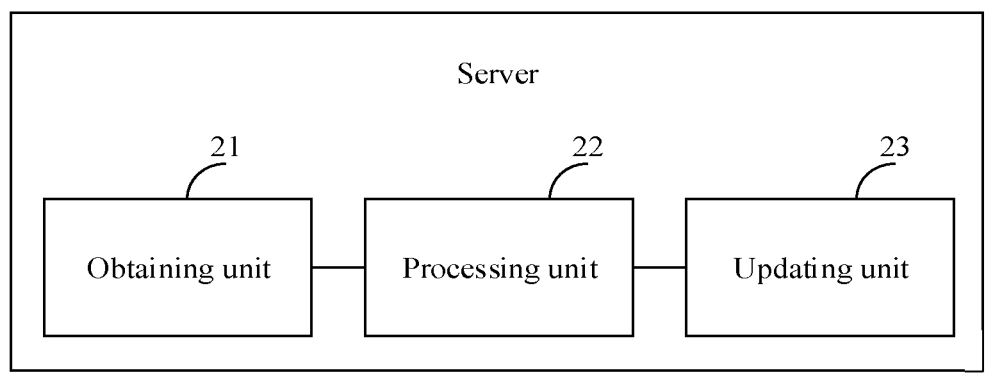
FIG. 22 is a block diagram of a server according to another embodiment of this application.

FIG. 22 is a block diagram of a server according to another embodiment of this application. As shown in FIG. 22, the server further includes an updating unit 23.

The updating unit 23 is configured to update a cloud database based on the map data.

Optionally, the database includes a spatial database and a file database, and the updating unit 23 is further configured to store the map data in the spatial database and the file database. The spatial database stores a unique vehicle ID, the geometric data, and the metadata, the file database stores the safety data file, and the spatial database is associated with the file database using the metadata.

Optionally, the database includes a process database, a reality database, and a history database. The process database is used to store the first basic safety information data. The reality database is used to store the map data. The history database is used to store all the map data that starts to be obtained at an initial moment.

Optionally, the updating unit 23 is further configured to obtain a value of an association between the map data and second basic safety information data, and if the association value is greater than or equal to a preset threshold, update the reality database based on the map data, and load the map data into the history database, or if the association value is less than the preset threshold, load the map data into the reality database.

For detailed descriptions of implementation principles and beneficial effects of the server provided in this embodiment of this application, refer to the method embodiments in FIG. 13 to FIG. 16. Details are not described herein again.

Figure 23:
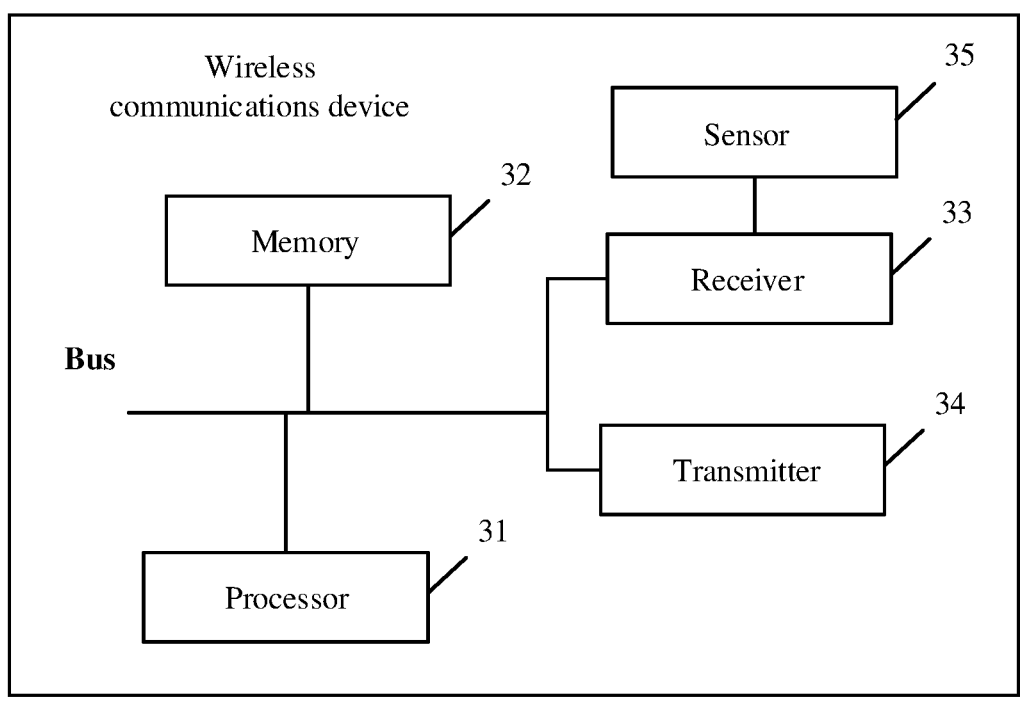
FIG. 23 is a block diagram of a wireless communications device according to an embodiment of this application.

FIG. 23 is a block diagram of a wireless communications device according to an embodiment of this application. As shown in FIG. 23, the wireless communications device includes a processor 31 and a memory 32.

The memory 32 is configured to store an instruction, and the processor 31 is configured to execute the instruction stored in the memory 32. When the processor 31 executes the instruction stored in the memory 32, the wireless communications device is configured to perform the method in any embodiment in FIG. 3 to FIG. 16.

Optionally, as shown in FIG. 23, the wireless communications device may further include a transmitter 34, a receiver 33, and a sensor 35. The transmitter 34 is configured to send data to another device. The receiver 33 is configured to receive data sent by the sensor 35 and another device. The sensor 35 is configured to collect information such as a speed and a temperature of a vehicle.

This application further provides a readable storage medium, and the readable storage medium stores an instruction. When at least one processor of a vehicle terminal executes the instruction, the vehicle terminal performs the map data obtaining method provided in any method embodiment.

This application further provides a readable storage medium, and the readable storage medium stores an instruction. When at least one processor of a server executes the instruction, the server performs the map data obtaining method provided in any method embodiment.

This application further provides a program product. The program product includes an instruction, and the instruction is stored in a readable storage medium. At least one processor of a vehicle terminal may read the instruction from the readable storage medium, and execute the instruction such that the vehicle terminal implements the map data obtaining method provided in any method embodiment.

This application further provides a program product. The program product includes an instruction, and the instruction is stored in a readable storage medium. At least one processor of a server may read the instruction from the readable storage medium, and execute the instruction such that the server implements the map data obtaining method provided in any method embodiment.

During specific implementation of a base station or a user equipment (UE), it should be understood that the processor may be a central processing unit (CPU), or may be another general purpose processor, a digital signal processor (DSP), an application-specific integrated circuit (ASIC), or the like. The general purpose processor may be a microprocessor, or the processor may be any conventional processor or the like. The steps of the methods disclosed with reference to this application may be directly performed by a hardware processor, or may be performed using a combination of hardware in the processor and a software module.

All or some of the steps of the foregoing method embodiments may be implemented by a program instructing related hardware. The foregoing program may be stored in a readable memory. When the program is executed, the steps of the method embodiments are performed. The foregoing memory includes a read-only memory (ROM), a random access memory (RAM), a flash memory, a hard disk, a solid-state drive, a magnetic tape, a FLOPPY DISK, an optical disc, and any combination thereof.

What is claimed is:

1. A method implemented by a vehicle, the method comprising:
   obtaining first basic safety information packets of the vehicle, wherein each of the first basic safety information packets comprises an information packet of the vehicle that is collected when a safety event occurs;
   obtaining first basic safety information data from the first basic safety information packets, wherein the first basic safety information data comprises parameter information of the vehicle and extended safety information, wherein the parameter information indicates a driving state of the vehicle and specifies width and height of the vehicle, and wherein the extended safety information indicates a first safety state of the vehicle and a second safety state of a road;
   performing model processing based on the first basic safety information data at least in part by:
   obtaining a data model of basic safety information based on the first basic safety information data;
   obtaining a basic safety information element corresponding to the first basic safety information data based on the data model, wherein the basic safety information element comprises geometric data, metadata, a safety data file, and an association relationship between the geometric data and the safety data file, and wherein the basic safety information element is a normalization expression of the data model;
   screening the first basic safety information packets in a time domain and a space domain to obtain second basic safety information packets;
   calculating a distance between a current position and a cubic curve;
   calculating, based on the distance, a confidence value of the second basic safety information packets; and
   screening, based on the confidence value, the second basic safety information packets;
   generating map data based on the model processing; and
   controlling behavior of the vehicle using the map data.

2. The method of claim 1, wherein screening the second basic safety information packets comprises:
   comparing the confidence value to a preset confidence threshold, wherein second basic safety information packets having confidence values below the preset threshold are discarded, and wherein second basic safety information packets at or above the threshold are retained as third basic safety information packets; and
   performing sorting and queue management on the third basic safety information packets to obtain the first basic safety information data.

3. The method of claim 2, further comprising:
   checking whether the second basic safety information packets conform to data quality criteria, wherein the data quality criteria comprise data integrity and data accuracy;
   outputting the third basic safety information packets based on a preset confidence value when the second basic safety information packets conform to the data quality criteria; and
   discarding the second basic safety information packets when the second basic safety information packets do not conform to the data quality criteria.

4. The method of claim 1, further comprising:
   obtaining position information of the vehicle and a current timestamp; and
   performing data filtering on the first basic safety information packets based on the position information, the current timestamp, a preset time range, and a preset space range, to obtain the second basic safety information packets, wherein the preset space range corresponds to a preset distance from the vehicle using the vehicle as an origin of the preset space range.

5. The method of claim 1, wherein the basic safety information element comprises an expression of a binary series indexing (BSI) feature structure.

6. The method of claim 1, further comprising:
   obtaining second basic safety information data from a cloud server;
   determining an association value between the second basic safety information data and the map data;
   updating the second basic safety information data based on the map data when the association value is greater than or equal to a preset threshold; and
   loading the map data into a local map database when the association value is less than the preset threshold.

7. The method of claim 1, wherein confidence value (V) is calculated according to a formula:

$$V = \begin{cases} 0, & s > 10 \\ (10-s)/10 \times 100\%, & s \leq 10 \end{cases};$$

wherein s is the distance.

8. A vehicle, comprising:
a sensor configured to obtain first basic safety information packets of the vehicle, wherein each of the first basic safety information packets comprises an information packet of the vehicle that is collected when a safety event occurs; and
at least one processor coupled to the sensor and configured to:
obtain first basic safety information data from the first basic safety information packets, wherein the first basic safety information data comprises parameter information of the vehicle and extended safety information, wherein the parameter information indicates a driving state of the vehicle and specifies width and height of the vehicle, and wherein the extended safety information indicates a first safety state of the vehicle and a second safety state of a road;
perform model processing based on the first basic safety information data at least in part by:
obtaining a data model of basic safety information based on the first basic safety information data;
obtaining a basic safety information element corresponding to the first basic safety information data based on the data model, wherein the basic safety information element comprises geometric data, metadata, a safety data file, and an association relationship between the geometric data and the safety data file, and wherein the basic safety information element is a normalization expression of the data model;
screening the first basic safety information packets in a time domain and a space domain to obtain second basic safety information packets;
calculating a distance between a current position and a cubic curve;
calculating, based on the distance, a confidence value of the second basic safety information packets; and
screening, based on the confidence value, the second basic safety information packets;
generate map data based on the model processing; and
control behavior of the vehicle using the map data.

9. The vehicle of claim 8, wherein the at least one processor is further configured to:
screen the second basic safety information packets;
compare the confidence value to a preset confidence threshold, wherein second basic safety information packets having confidence values below the preset threshold are discarded, and wherein second basic safety information packets at or above the threshold are retained as third basic safety information packets; and
perform sorting and queue management on the third basic safety information packets to obtain the first basic safety information data.

10. The vehicle of claim 9, wherein the at least one processor is further configured to:
check whether the second basic safety information packets conform to data quality criteria, wherein the data quality criteria comprises data integrity and data accuracy;
output the third basic safety information packets based on a preset confidence value when the second basic safety information packets conform to the data quality criteria; and
discard the second basic safety information packets when the second basic safety information packets do not conform to the data quality criteria.

11. The vehicle of claim 8, wherein the at least one processor is further configured to:
obtain position information of the vehicle and a current timestamp; and
perform data filtering on the first basic safety information packets, based on the position information of the vehicle, the current timestamp, a preset time range, and a preset space range, to obtain the second basic safety information packets.

12. The vehicle of claim 8, wherein the basic safety information element comprises an expression of a binary series indexing (BSI) feature structure.

13. The vehicle of claim 8, wherein the at least one processor is further configured to:
obtain second basic safety information data from a cloud server;
determine an association value between the second basic safety information data and the map data;
update the second basic safety information data based on the map data when the association value is greater than or equal to a preset threshold; and
load the map data into a local map database when the association value is less than the preset threshold.

14. The vehicle of claim 8, wherein the at least one processor is further configured to calculate the confidence value (V) according to a formula:

$$V = \begin{cases} 0, s > 10 \\ (10-s)/10 \times 100\%, s \leq 10 \end{cases};$$

wherein s is the distance.

15. A system, comprising:
a vehicle; and
a server communicatively coupled to the vehicle and comprising:
a receiver configured to obtain first basic safety information data of the vehicle, wherein the first basic safety information data comprises parameter information of the vehicle and extended safety information, wherein the parameter information indicates a driving state, width, height and appearance information of the vehicle, and wherein the extended safety information indicates a first safety state of the vehicle and a second safety state of a road;
at least one processor coupled to the receiver and configured to:
perform model processing based on the first basic safety information data;
screen the first basic safety information data in a time domain and a space domain to obtain second basic safety information packets;
calculate a distance between a current position and a cubic curve;
calculate, based on the distance, a confidence value of the second basic safety information packets;
screen, based on the confidence value, the second basic safety information packets; and
generate map data based on the model processing at least in part by recording a discrete point vector map image layer of safety attributes of the vehicle; and a transmitter configured to send the map data to the vehicle, wherein the vehicle is configured to:
receive the map data from the server; and
control behavior of the vehicle using the map data.

16. The system of claim 15, wherein the at least one processor is further configured to:
obtain a data model of basic safety information based on the first basic safety information data;
obtain a basic safety information element corresponding to the first basic safety information data based on the data model, wherein the basic safety information element comprises geometric data, metadata, a safety data file, and an association relationship between the geometric data and the safety data file; and
construct the map data based on the basic safety information element.

17. The system of claim 16, further comprising a database, wherein the database comprises a spatial database and a file database, wherein the at least one processor is further configured to store the map data in the spatial database and the file database, wherein the spatial database is configured to store a unique vehicle identifier, the geometric data, and the metadata, wherein the file database is configured to store the safety data file, and wherein the spatial database is associated with the file database using the metadata.

18. The system of claim 16, further comprising a database, wherein the database comprises:
a process database configured to store the first basic safety information data;
a reality database configured to store the map data; and
a history database configured to store all map data obtained at an initial moment.

19. The system of claim 18, wherein the at least one processor is further configured to:
obtain an association value between the map data and second basic safety information data;
update the reality database based on the map data; and
load the map data into the history database when the association value is greater than or equal to a preset threshold.

20. The system of claim 18, wherein the at least one processor is further configured to:
obtain an association value between the map data and second basic safety information data; and
load the map data into the reality database when the association value is less than a preset threshold.

* * * * *